(12) United States Patent
Ezra et al.

(10) Patent No.: US 9,383,942 B2
(45) Date of Patent: Jul. 5, 2016

(54) STORAGE SYSTEM CAPABLE OF MANAGING A PLURALITY OF SNAPSHOT FAMILIES AND METHOD OF OPERATING THEREOF

(71) Applicant: Infinidat Ltd., Hertzelia Pituach (IL)

(72) Inventors: Josef Ezra, Even Yehuda (IL); Yechiel Yochai, Moshav Aviel (IL); Ido Ben-Tsion, Ramat Gan (IL); Efraim Zeidner, Haifa (IL)

(73) Assignee: INFINIDAT LTD., Herzliya (IL)

( * ) Notice: Subject to any disclaimer, the term of this patent is extended or adjusted under 35 U.S.C. 154(b) by 230 days.

(21) Appl. No.: 14/092,208

(22) Filed: Nov. 27, 2013

(65) Prior Publication Data

US 2014/0149665 A1  May 29, 2014

Related U.S. Application Data

(60) Provisional application No. 61/730,988, filed on Nov. 29, 2012.

(51) Int. Cl.
*G06F 3/06* (2006.01)
*G06F 11/14* (2006.01)
*G06F 12/08* (2016.01)
*G06F 17/30* (2006.01)

(52) U.S. Cl.
CPC .............. *G06F 3/065* (2013.01); *G06F 3/0604* (2013.01); *G06F 3/0605* (2013.01); *G06F 3/0614* (2013.01); *G06F 3/0683* (2013.01); *G06F 3/0689* (2013.01); *G06F 11/1446* (2013.01); *G06F 11/1458* (2013.01); *G06F 12/0864* (2013.01); *G06F 17/30088* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 4,864,497 A | 9/1989 | Lowry | |
| 5,553,266 A | 9/1996 | Metzger | |
| 6,038,639 A | 3/2000 | O'Brien et al. | |
| 6,353,836 B1 | 3/2002 | Bamford | |
| 6,651,075 B1 | 11/2003 | Kusters et al. | |
| 7,165,156 B1 | 1/2007 | Cameron | |
| 7,600,098 B1 | 10/2009 | Chou | |
| 8,019,944 B1 | 9/2011 | Favor et al. | |
| 8,082,407 B1 * | 12/2011 | Chatterjee | G06F 9/4416 707/639 |
| 8,145,865 B1 | 3/2012 | Longinov et al. | |
| 8,359,491 B1 | 1/2013 | Bloomstein | |

(Continued)

*Primary Examiner* — Kaushikkumar Patel
(74) *Attorney, Agent, or Firm* — Reches Patents

(57) ABSTRACT

There is provided a storage system comprising a control layer operable to manage a snapshot family (SF) constituted by SF members having hierarchical relations represented by a SF relationship data structure and a method of operating thereof. Upon receiving a command for restoring a writable SF member from a read-only snapshot thereof, the control layer provides a foreground atomic operation. The atomic operation comprises generating a new writable snapshot of the read-only snapshot (a destination SF member), modifying the SF relationship data structure, and re-assigning all logical unit numbers (LUNs) from the writable SF member to be restored to the destination SF member. Upon successful completion of the atomic operation, the control layer sends acknowledgement indicative of successful restoring the writable SF member. The control layer further provides a background process comprising modifying, in correspondence with the provided atomic operation, a SF mapping data structure comprising mappings between logical and physical addresses corresponding to SF members.

16 Claims, 19 Drawing Sheets

(56) References Cited

U.S. PATENT DOCUMENTS

| | | |
|---|---|---|
| 8,555,029 B2 | 10/2013 | Yochai et al. |
| 8,706,705 B1 | 4/2014 | Warrington |
| 9,021,087 B1 | 4/2015 | Weng |
| 2002/0069341 A1 | 6/2002 | Chauvel et al. |
| 2002/0073282 A1 | 6/2002 | Chauvel et al. |
| 2003/0079102 A1 | 4/2003 | Lubbers et al. |
| 2003/0182313 A1 | 9/2003 | Federwisch et al. |
| 2004/0078533 A1 | 4/2004 | Lee |
| 2004/0267706 A1 | 12/2004 | Springer et al. |
| 2005/0005070 A1 | 1/2005 | Lam |
| 2005/0066095 A1* | 3/2005 | Mullick ............ G06F 17/30171 710/200 |
| 2006/0155946 A1* | 7/2006 | Ji ........................ G06F 3/0617 711/162 |
| 2006/0242211 A1* | 10/2006 | Becker ................ G06F 11/1456 |
| 2007/0055833 A1* | 3/2007 | Vu ...................... G06F 11/1469 711/162 |
| 2007/0174669 A1* | 7/2007 | Ebata .................. G06F 11/1469 714/6.1 |
| 2008/0172542 A1 | 7/2008 | Kaushik |
| 2008/0281877 A1 | 11/2008 | Wayda et al. |
| 2008/0301203 A1 | 12/2008 | Adkins |
| 2010/0042791 A1* | 2/2010 | Helman .............. G06F 11/1435 711/162 |
| 2011/0082997 A1 | 4/2011 | Yochai |
| 2011/0119459 A1 | 5/2011 | Satoyama |
| 2011/0246733 A1* | 10/2011 | Usgaonkar ............ G06F 3/0608 711/162 |
| 2011/0271067 A1 | 11/2011 | Chou et al. |
| 2012/0254547 A1 | 10/2012 | Benhase et al. |
| 2012/0311261 A1 | 12/2012 | Mizuno et al. |
| 2013/0031058 A1 | 1/2013 | Adkins et al. |
| 2013/0080695 A1* | 3/2013 | Beeken ................... G06F 3/065 711/112 |
| 2013/0124486 A1 | 5/2013 | Helman et al. |
| 2013/0138916 A1 | 5/2013 | Ohara |
| 2013/0325824 A1* | 12/2013 | Shoens ............. G06F 17/30115 707/698 |
| 2014/0089264 A1 | 3/2014 | Talagala et al. |

\* cited by examiner

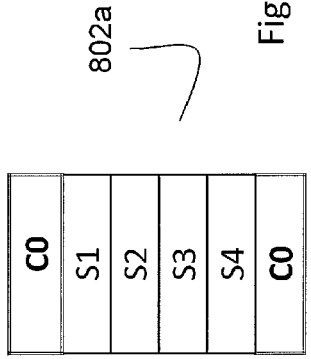
Figure 8a
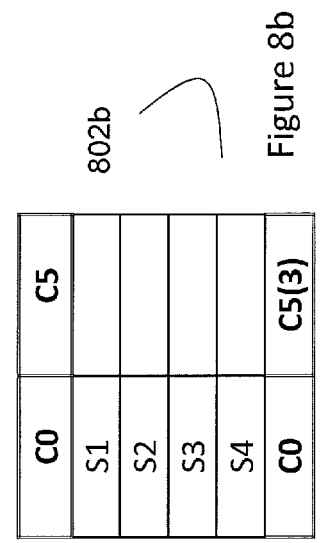
Figure 8b
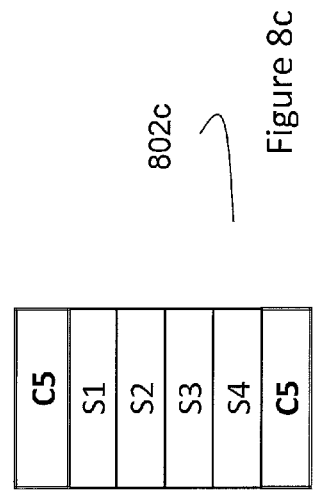
Figure 8c
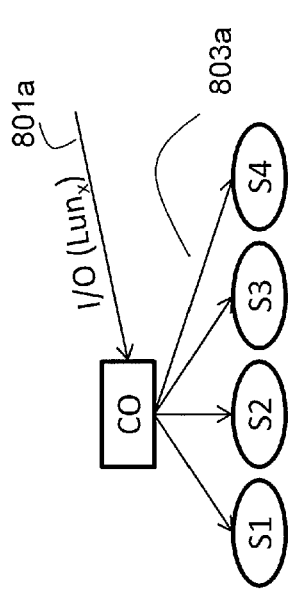
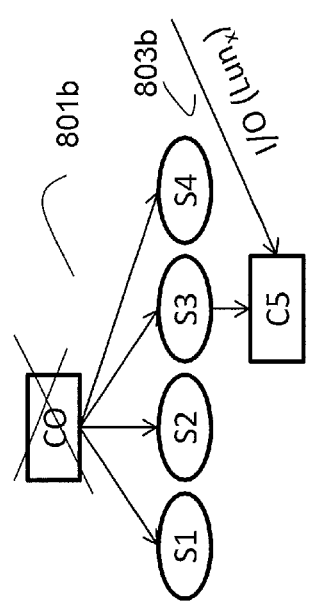
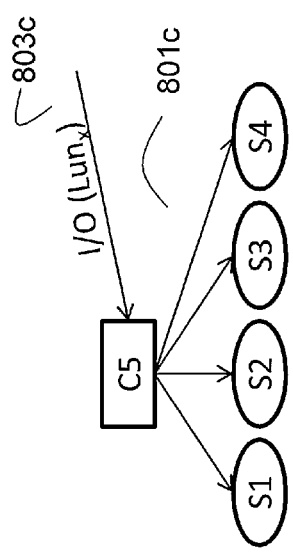

STORAGE SYSTEM CAPABLE OF MANAGING A PLURALITY OF SNAPSHOT FAMILIES AND METHOD OF OPERATING THEREOF

CROSS-REFERENCES TO RELATED APPLICATIONS

This application claims priority from U.S. Provisional Patent Application No. 61/730,988 filed Nov. 29, 2012. This patent application relates to U.S. patent application Ser. No. 14/036,557 filed Sep. 25, 2013. The disclosures of U.S. 61/730,988 and U.S. Ser. No. 14/036,557 are incorporated herein by reference in their entireties.

TECHNICAL FIELD

The presently disclosed subject matter relates generally to systems and methods of storing data and, particularly, to methods of operating storage systems in the presence of a plurality of snapshots, and systems thereof.

BACKGROUND OF THE INVENTION

Modern storage systems are configured to enable providing copies of existing data for purposes of backup, possible restore in case of future data corruption, testing, etc. The copies may be provided with the help of backup and/or snapshot techniques. The use of snapshot techniques greatly reduces the amount of storage space required for archiving large amounts of data.

Problems of operating storage systems in the presence of a plurality of snapshots have been recognized in the conventional art and various techniques have been developed to provide solutions. For example:

US Patent Application No. 2011/0119459 (Satoyama et al.) discloses a storage system including a storage device which configures an original volume for storing data which is read/written by a host, a copy volume for storing a copy of the original volume at a predetermined timing, and a snapshot volume for storing a snapshot data which is a snapshot of the original volume; and a controller which controls access from the host to the storage device. The controller copies data of the original volume to the copy volume at a predetermined timing; stores the snapshot data in the snapshot volume corresponding to a write request to the original volume without decreasing a performance of the original volume; manages a generation of the stored snapshot according to predetermined copy volume blocks and snapshot volume blocks, and manages a generation of the copy volume; and reads data from the snapshot volume and/or the copy volume when a read request to a volume of a generation different from that of the original volume is received from the host, without decreasing a performance of the original volume.

US Patent Application No. 2008/172542 (Kaushik) discloses a method, apparatus and system of a hierarchy of a structure of a volume. In one embodiment, a system includes a physical volume, a structure to provide a mapping to a location of a data segment of the physical volume that may include a table having a hierarchy, a logical volume management module to define a logical volume as an arrangement of the physical volume, a snapshot module that may automatically generate a point-in-time image of the logical volume, may prompt the logical volume management module to create and insert a first table and a second table into the hierarchy of the structure, the first table may provide a set of updates to the logical volume, the second table may provide a set of updates to the point-in-time image, and a data processing system to perform a write IO operation and a read IO operation.

US Patent Application 2008/301203 (Adkins et al.) discloses an embodiment where at least one snapshot thread manages a point in time snapshot of a file system stored within the space allocated to the file system. The snapshot thread tracks, for at least one block of the plurality of blocks of the file system, a separate entry in a snapshot map specifying if each at least one block is newly allocated following the creation of the point in time snapshot and specifying an addressed location of a snapshot copy of the at least one block, if copied. Separately, a file system handling thread tracks a mapping of an allocation state of each of said plurality of blocks of the file system. Responsive to detecting the file system triggered to write or delete a particular block from among the at least one block of the file system, the snapshot thread allows the file system to write to or delete the particular block without making a snapshot copy of the particular block if a particular entry for the particular block in the snapshot map specifies the particular block is newly allocated, wherein a block marked newly allocated was not in-use at the point in time of the file system snapshot.

U.S. Pat. No. 6,038,639 (O'Brien et al.) discloses a data file storage management system for snapshot copy operations which maintains a two level mapping table enabling the data files to be copied using the snapshot copy process and only having to update a single corresponding mapping table entry when the physical location of the data file is changed. The snapshot copy updates to the contents of the first level of the two level mapping table, which are stored on the backend data storage devices to provide a record of the snapshot copy operation which can be used to recover the correct contents of the mapping table. This record of the snapshot copy operations remains valid even though the physical location of a copied data file instance is subsequently changed. Furthermore, the physical storage space holding the updated portions of the first level of the two level mapping table can be managed using techniques like those used to manage the physical storage space holding data file instances. Mapping table updates resulting from the snapshot copy operation are delayed until all mapping table updates resulting from earlier data file write operations have been completed and any attempt to update the mapping table to reflect data written to the original data file or the copy data file that occurs after initiation of the copy must wait until the first set of mapping table pointers have been copied.

U.S. Pat. No. 7,165,156 (Cameron, et al.) discloses a chain of snapshots including read-write snapshots descending from a read only snapshot. The read only snapshots present a constant view of the data at the time the read only snapshot is created, and the read-write snapshot starts with the view but can be modified by the user without changing the view of its parent snapshot (e.g., the read only snapshot). The read-write snapshot can be written for various testing purposes while the read only snapshot remains undisturbed to preserve the original data.

US Patent Application No. 2013/0124486 (Helman, et al.) discloses data storage with snapshot-to-snapshot recovery. A corrupted node under a first meta-volume node in a hierarchical tree structure is deleted. The hierarchical tree structure further includes a source node under the first meta-volume node. The corrupted node and the source node each include a respective set of local pointers. The corrupted node and the source node represent respective copies of a logical volume. The source node is reconfigured to become a second meta-volume node having the same set of local pointers as the source node. A first new node is created under the second meta-volume node in the hierarchical tree structure to represent the corrupted node. A second new node is created under the second meta-volume node to represent the source node. The first and second new nodes are configured to have no local pointers.

GENERAL DESCRIPTION

In accordance with certain aspects of the presently disclosed subject matter, there is provided a method of operating a storage system comprising a control layer operable to manage a snapshot family (SF) constituted by SF members having hierarchical relations represented by a SF relationship data structure. The method comprises: upon receiving a command for restoring a writable SF member from a read-only snapshot thereof, the control layer providing an atomic operation comprising generating a new writable snapshot of the read-only snapshot to yield a destination SF member and modifying the SF relationship data structure accordingly to yield a modified SF relationship data structure, and re-assigning all logical unit numbers (LUNs) from the writable SF member to be restored to the destination SF member; and upon successful completion of the atomic operation, the control layer sending acknowledgement indicative of successful restoring the writable SF member.

The method can further comprise a background process provided by the control layer. The background process can comprise modifying, in correspondence with the provided atomic operation, a SF mapping data structure comprising mappings between logical and physical addresses corresponding to SF members. Modifying the SF mapping data structure can be provided with further correspondence with one or more write requests received during the background process and addressed to SF members and/or with one or more modifications of SF relationship data structure during the background process.

In accordance with other aspects of the presently disclosed subject matter, there is provided a storage system comprising a control layer configured to manage a plurality of snapshot families, each family constituted by snapshot family (SF) members having hierarchical relations represented by a SF relationship data structure. The control layer is configured: upon receiving a command for restoring a writable SF member from a read-only snapshot thereof, to provide an atomic operation comprising generating a new writable snapshot of the read-only snapshot to yield a destination SF member, modifying the SF relationship data structure accordingly to yield a modified SF relationship data structure and re-assigning all logical unit numbers (LUNs) from the writable SF member to be restored to the destination SF member; and, upon successful completion of the atomic operation, to send acknowledgement indicative of successful restoring the writable SF member.

The control layer can be further configured to provide a background process comprising modifying, in correspondence with the provided atomic operation, a SF mapping data structure comprising mappings between logical and physical addresses corresponding to SF members.

In accordance with further aspects of the presently disclosed subject matter, during the background process the control layer can generate a definitive SF relationship data structure corresponding to an initial SF relationship data structure characterising the snapshot family when the atomic operation started; handle the initial and the definitive SF relationship data structures till the end of the background process; successively modify mappings in the SF mapping data structure whilst keeping data informative of mappings which have been already modified; serve an I/O request addressed to an LBA range corresponding to already modified mappings of SF mapping data structure using the SF mapping data structure and the definitive SF relationship data structure, and serve an I/O request addressed to an LBA range corresponding to unmodified mappings of SF mapping data structure using the SF mapping data structure and the initial SF relationship data structure.

SF mapping data structure can be configured as a mapping tree. In such a case, successively modifying the mappings can comprise traversing the mapping tree; wherein the data informative of mappings which have been already modified can be a value of a counter indicative of a currently traversed LBA, and the control layer can compare the LBA range addressed in the I/O request with a current counter's value, and to serve the I/O request accordingly.

In accordance with further aspects of the presently disclosed subject matter, the definitive SF relationship data structure can be modified responsive to generating a new snapshot from the destination snapshot before completion of the background process. In such a case, the control layer serves the I/O request using the modified definitive SF relationship data structure.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 8a-8e illustrate non-limiting examples of S-tree and clone line table at different stages of restoring process.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "computing", "calculating", "modifying", "generating", "configuring" or the like, refer to the action and/or processes of a computer that manipulate and/or transform data into other data, said data represented as physical, such as electronic, quantities and/or said data representing the physical objects. The term "computer" should be expansively construed to cover any kind of electronic device with data processing capabilities including, by way of non-limiting example, storage system and parts thereof (e.g. control layer and parts thereof) disclosed in the present application.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

The references cited in the background teach many principles of storage systems operation that may be applicable to the presently disclosed subject matter. Therefore the full contents of these publications are incorporated by reference herein where appropriate for appropriate teachings of additional or alternative details, features and/or technical background.

It is to be understood that the term "non-transitory" is used herein to exclude transitory, propagating signals, but to include, otherwise, any volatile or non-volatile computer memory technology suitable to the presently disclosed subject matter.

Figure 1:
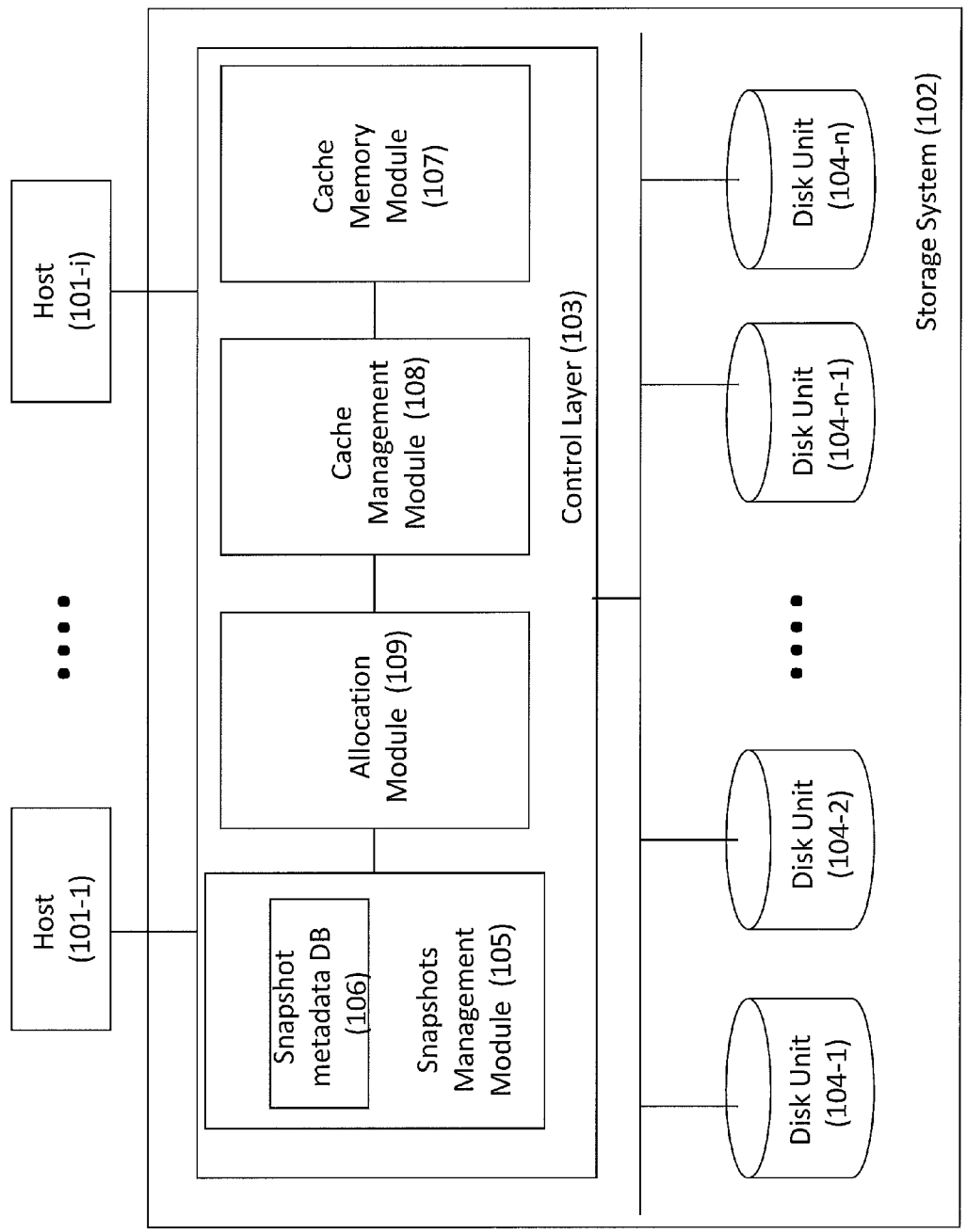
FIG. 1 illustrates a schematic functional diagram of a mass storage system in accordance with certain embodiments of the presently disclosed subject matter.

Bearing this in mind, attention is drawn to FIG. 1 illustrating a non-limiting example of a schematic functional diagram of a mass storage system in accordance with certain embodiments of the presently disclosed subject matter.

The illustrated mass storage system 102 provides common storage means to be shared by a plurality of host computers (illustrated as 101-1-101-n). The storage system comprises a control layer 103 comprising one or more appropriate storage control devices operatively coupled to the plurality of host computers and operable to control access operations between the plurality of host computers and a plurality of data storage devices (e.g. a plurality of physical disk drives (PD) organized in one or more arrays illustrated as disk units 104-1-104-n). The storage devices constitute a physical storage space optionally distributed over one or more storage nodes, wherein the storage control layer is operable to control interface operations (including access operations) between the host computers and the storage physical space. The storage system is configured in a manner enabling direct or indirect servicing a request directed at any available address in the physical storage space.

The physical storage space can comprise any appropriate permanent storage medium and can include, by way of non-limiting example, a plurality of physical disk drives (PD) organized in one or more arrays (illustrated as disk units 104-1-104-n). The physical storage space comprises a plurality of data blocks, each data block being characterized by a pair ($DD_{id}$, DBA), and where $DD_{id}$ is a serial number associated with the physical disk drive accommodating the data block, and DBA is a logical block number within the respective disk. By way of non-limiting example, $DD_{id}$ may represent a serial number internally assigned to the physical disk drive by the system or, alternatively, a WWN or universal serial number assigned to the disk drive by a vendor.

Stored data can be logically represented to a client in terms of logical objects. Depending on storage protocol, the logical objects may be logical volumes, data files, multimedia files, snapshots and other copies, etc. For purpose of illustration only, the following description is provided with respect to logical objects represented by logical volumes.

A logical volume (LV) is a virtual entity logically representing a plurality of data blocks and acting as basic units for data handling and organization within the system. Logical volumes are characterized by successive Logical Block Addresses (LBA) ranging from 0 to a number K, wherein K is the number of data blocks comprised in the logical volume. Different LVs may comprise different numbers of data blocks, while the data blocks are typically of equal size (e.g. 512 bytes).

The same logical volume can be exposed to the outside world as one or more uniquely addressable logical units, each appearing as a single virtual storage device to hosts, file systems, databases, and other application programs. Each logical unit can be characterized by a logical unit identifier (e.g. a logical unit number, or LUN), used to identify the logical unit when addressed by the SCSI protocol or protocols which encapsulate SCSI, such as, for example, Fibre Channel or iSCSI. LUN numbers can be assigned to the logical units in accordance with an addressing scheme. By way of non-limiting example, in a multiple port storage array, a logical volume can be assigned a different LUN on each port through which the logical volume is accessed. Optionally, an external management server (not shown in FIG. 1) can keep a list of which LUNs each host and/or application is allowed to access.

When receiving a write request from a host, the storage control layer identifies a physical location(s) designated for writing the respective data. Similarly, when receiving a read request from the host, the storage control layer identifies the physical location(s) of the desired data portion(s) and further processes the request accordingly. The storage control layer further issues updates of a given data object to all storage nodes which physically store data related to the data object. The storage control layer is further operable to redirect, if required, the request/update to storage device(s) with appropriate storage location(s) irrespective of the specific storage control device receiving the access request.

The control layer further comprises a snapshot management module 105. The functions of the snapshot management module include managing the snapshots and groups thereof.

A snapshot logical volume (referred to hereinafter also as a "snapshot") is a logical entity representing a virtual copy of a source logical volume as it existed at the time of creating the snapshot. As will be further detailed with reference to FIGS. 2-3, a given snapshot (referred to hereinafter as a parent snapshot) can serve as a source volume for one or more further snapshots (referred to hereinafter as child snapshots). Each snapshot has one source logical volume (initial logical volume or a parent snapshot). A given logical volume at a starting point-in-time (referred to hereinafter as a master logical volume) and the snapshots corresponding thereto and created at different later points-in-time constitute a snapshot family (SF) associated with the given master logical volume.

It is noted that starting point-in-time is configurable and any writable snapshot can be selected as a master volume of the snapshot family constituted by the master volume and its descendant snapshots. The master logical volume and the snapshots corresponding thereto are referred to hereinafter as snapshot family members. Some of the snapshots in the snapshot family can be writable, while other snapshots can be configured as read-only snapshots. The hierarchical relationship (e.g. siblings, parents, grandparents, siblings of a parent, descendants (children), etc.) between the members of the snapshot family can be represented as a tree with one or more branches.

A state of a parent snapshot family member can be restored based on its snapshot child to the instance when this child snapshot was taken.

For purpose of illustration only, in the following description a snapshot family corresponds to a given logical volume. Those skilled in the art will readily appreciate that the teachings of the present disclosure are applicable in a similar manner to a snapshot family corresponding to other appropriate logical groups (e.g. snapshots created at different point in time for a consistency group of logical volumes, for one or more virtual partitions, or for other logical objects).

A snapshot is usually implemented by using pointers. Any newly created snapshot shares data with the source logical volume with the help of pointers constituting a part of the system metadata. Hence, at the time of creation, the new snapshot consumes physical resources merely for storing related metadata, and no additional physical resources are required for storing data associated with the snapshot logical volume. Only when a portion of either the source or its respective snapshot is modified, new data is created and, accordingly, new physical resources are allocated to this data in the disks.

Each of the snapshot family's members comprises the same number of logical blocks. In order for either the source volume or the snapshot to be addressable from an external host via a SCSI command, a LUN has to be defined, thus enabling connection between a port in the host and the volume or snapshot via a respective port in the storage system. The information about the defined LUNs is stored as a part of the system metadata. Access requests (e.g. write requests, read requests, etc. are addressed to the LUN with specified ranges of LBAs. The storage system can interpret the request so that it will be addressed to the intended source volume or snapshot.

Metadata related to snapshot management can be managed by the snapshot management module 105 and accommodated at a dedicated location(s) in the storage devices and/or in a non-volatile memory comprised in the control layer (e.g. implemented as snapshot metadata database 106 of the snapshot management module). A copy of the snapshot metadata can further reside in the volatile memory. By way of non-limiting example, the metadata accommodated in connection with snapshots management can include the snapshot volume identifiers (e.g. Snap_ID, Snap_LUN, etc.), flags indicating various states related to the snapshot (e.g., in use, delete in progress, marked for deletion, delete complete, etc.), size of snapshot volumes, and other snapshot related metadata.

The storage control layer 103 further comprises a volatile cache memory 107 for temporarily storing the data to be written to the storage devices in response to a write request and/or for temporarily storing the data to be read from the storage devices in response to a read request. In accordance with certain embodiments of the presently disclosed subject matter, the control layer further comprises a cache management module 108 operatively connected to the cache memory and to the snapshot management module 105.

Upon receiving by the control layer a read request specifying LBA to be read, the cache management module determines whether the respective data is presently contained within the cache. If the determination indicates that the addressed block is presently within the cache, then a cache hit occurs and the data can be transferred from the cache to the host. On the other hand, if the check indicates that the requested data is not within the cache, then a cache miss occurs, and the respective data is read from a storage device.

During the write operation the data is temporarily retained in cache memory 107 until subsequently written to one or more data storage devices. Such temporarily retained data, modified in cache and not modified in the storage devices, is referred to hereinafter as "dirty data". Once the dirty data is sent to the respective nonvolatile storage medium, its status is changed to "non-write-pending", and the storage system relates to this data as stored at the nonvolatile storage medium and allowed to be erased from the cache memory. Such data is referred to hereinafter as "clean data".

Optionally, the control layer can further comprise (not shown) a first virtual layer operable to represent the logical address space, the first virtual layer characterized by a plurality of virtual unit addresses (VUA). Alternatively or additionally, the control layer can further comprise a second virtual layer operable to represent the physical storage space, the second virtual layer characterized by a plurality of virtual disk addresses (VDA). By way of non-limiting example, respective architecture and operation of the control layer is detailed in International Patent Application No. WO 2010/092576 assigned to the Assignee of the present application and incorporated thereto by reference in its entirety.

Mapping between logical addresses (LBA addresses, VUA addresses) and physical addresses (VDA addresses, DBA addresses) can comprise at least one of the mapping options:
 a) mapping between LBA addresses and DBA addresses;
 b) mapping between VUA addresses and VDA addresses;
 c) mapping between LBA addresses and VDA addresses; and
 d) mapping between VUA addresses and DBA addresses.

For purpose of illustration only, in the following description the mapping is presented between LBA addresses and DBA addresses. Those skilled in the art will readily appreciate that the teachings of the present disclosure are applicable in a similar manner to other mapping options between logical addresses and physical addresses.

The control layer further comprises an allocation module 109 operatively coupled to the snapshot management module 105 and the cache management module 108. The allocation module 109 can be configured to handle one or more mapping data structures, each assigned to a respective given snapshot family and operable to provide mapping between one or more contiguous ranges of logical addresses within logical address space of the given snapshot family and physical addresses corresponding to a snapshot family member specified in an access request. Such data structure is referred to hereinafter as a snapshot family mapping data structure and is further detailed with reference to FIGS. 4-9.

The snapshot management module, the cache memory, the cache management module and the allocation module are operatively connected, configured to facilitate operations in accordance with the presently disclosed subject matter as further detailed with reference to FIGS. 2-9 and each can be implemented in any appropriate combination of software, firmware and hardware. The snapshot management module, the allocation module, the cache memory and/or the cache management module can be implemented as centralized modules operatively connected to the plurality of storage control devices or can be, at least partly, distributed over some or all storage control devices.

Those versed in the art will readily appreciate that the teachings of the presently disclosed subject matter are not bound by the system illustrated in FIG. 1, equivalent and/or modified functionality can be consolidated or divided in another manner and can be implemented in any appropriate combination of software, firmware and hardware.

Figure 2:
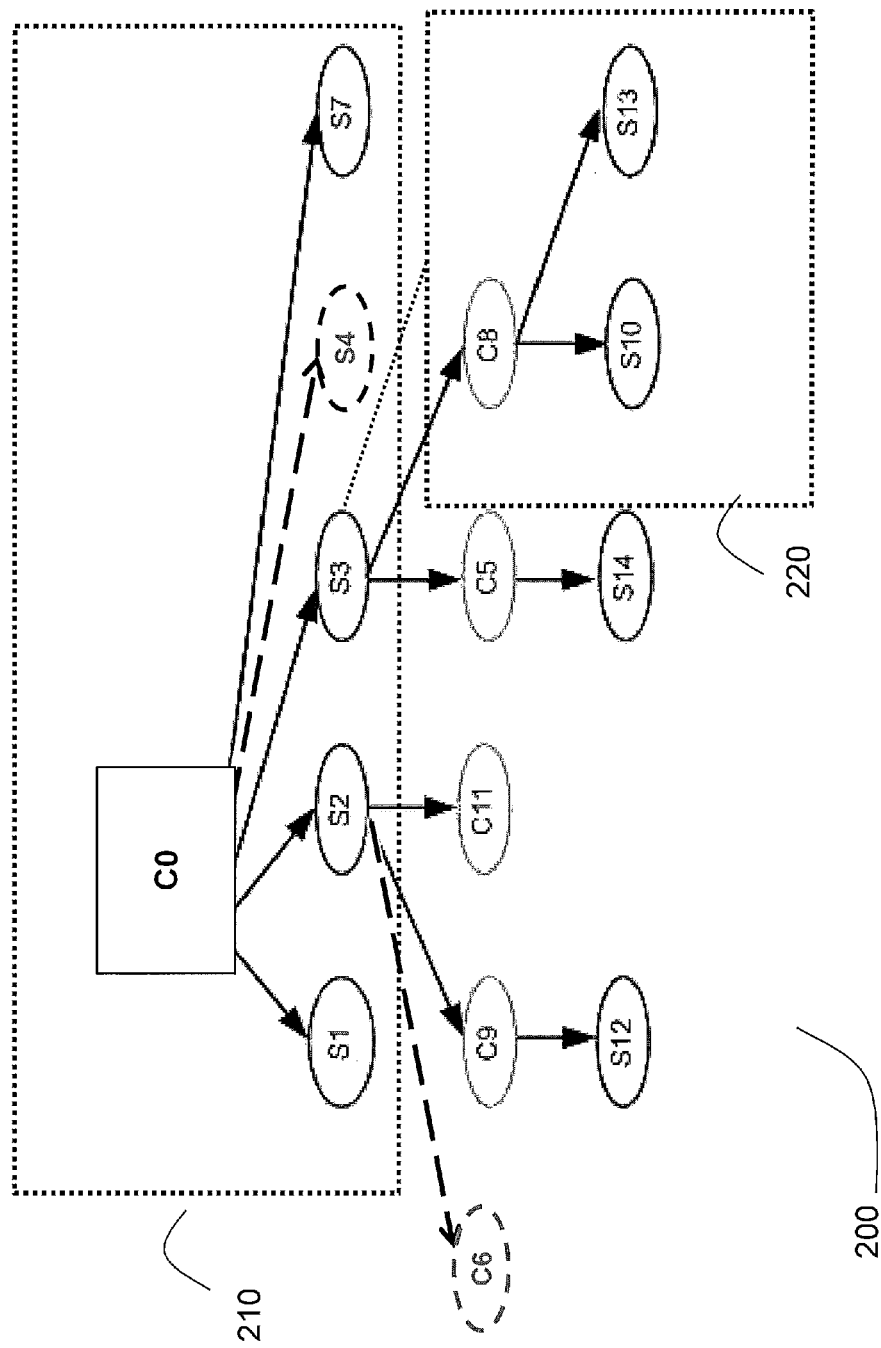
FIG. 2 illustrates an exemplary snapshot family represented by a snapshot tree.

FIG. 2 illustrates an exemplarily snapshot family represented by a snapshot tree (referred to hereinafter also as S-tree). The illustrated S-tree 200 is a data structure representing hierarchical relationship between a master logical volume C0 and its snapshots. Unless specifically stated otherwise, it is appreciated that throughout the specification the following terms should be construed as following:

Family_ID denotes an identifier associated with the entire snapshot family including a master volume constituting a root of a respective snapshot family and its descendant snapshots.

Members of the snapshot family are denoted by letter S indicative of read-only snapshots or by letter C indicative of the master volume or writable snapshots (also referred to hereinafter as clones). The members of the snapshot family are further denoted by a snapshot identifier, Snap_ID, which uniquely identifies a specific snapshot member within the snapshot family and is further indicative of the order of creation of the member. The snapshot identifier may be, for example, a running index associated with the respective members according to their order of creation, etc. A snapshot identifier of an earlier created member is smaller than a snapshot identifier of a later created snapshot. Referring to S-Tree 200, snapshot S10, for example, was created before S12, S13, S14 and 11 (even though the latter resides in a higher hierarchy level in the tree than the hierarchy level of S10). The master volume is denoted as C0.

It is noted that if writable snapshots are not supported, the S-tree only includes C0 as the root with all the snapshots residing at the same level next to C0.

The illustrated, by way of non-limiting example, snapshot family is generated in a manner that read-only snapshots are generated as children of writeable snapshots (clones), and the clones are generated as children of read-only snapshots, i.e. a parent of a read-only member is always a writable member of the snapshot family.

In the illustrated S-tree, the writable master volume C0 has direct read-only children S1, S2, S3, S4 and S7. Snapshots C5, C8, S14, S10 and S13 are descendants of S3 while S10 and S13 are children of C8; C6, C9, C11 and S12 are descendants of S2 while S12 is a child of C9. Dashed lines for S4 and C6 denote that these snapshots have been deleted.

S-tree 200 is updated (e.g. by the snapshot management module) each time a snapshot in the family is created, removed or restored.

Hierarchical relationship between a master logical volume C0 and its snapshots can be also represented by a clone line table. S-tree, clone line table or any other data structures representing hierarchical relationship between SF members are referred to hereinafter as SF relationship data structures.

In accordance with certain embodiments of the presently disclosed subject matter, each node of the S-Tree can be associated with information relating to a respective member of the snapshot family: e.g. references to an older sibling in the S-tree, references to a younger sibling, parent, descendants, read-only flag, etc. Fast access to the nodes in the S-Tree can be enabled by maintaining a Snapshot Lookup Table. Optionally, a separate look-up table can be assigned to each snapshot family. The Snapshot Lookup Table is characterized by Snap_ID as a key, and a pointer to the location of the respective node in memory as the lookup value.

It is noted that the teachings of the presently disclosed subject matter are applicable in a similar manner to other hierarchical relationships within a snapshot family.

A group of snapshots, constituted by a writable member and one or more generations of read-only children with no writable member between the generations, is referred to hereinafter as an inheritance cluster. For example, in the illustrated S-tree 200, an inheritance cluster 210 includes the master volume C0 and read-only snapshots S1, S2, S3, S4 and S7. An inheritance cluster can be further associated with a direct parent of its writable member, this direct parent can serve as a link to an upper level inheritance cluster. For example, an inheritance cluster 220 includes the writable member C8, its read-only descendants S10 and S13. The inheritance cluster 220 is further associated with S3, the read-only parent of the writable member C8, which links between cluster 220 and the upper inheritance cluster 210.

Each writable member of the snapshot family can be associated with a corresponding inheritance cluster. A sequential relationship between the members of a given inheritance cluster can be represented by a column in a clone line table, such a column being referred to hereinafter as a clone line. The clone line table comprises one or more clone lines, one clone line for each writeable family member. A clone line of a given writable family member (such member being referred to hereinafter also as a parent clone) comprises a sequence of the parent clone and read-only members of a respective inheritance cluster, the sequence order being in accordance with respective creation time. The clone line further comprises a value indicative of the direct parent of the parent clone, this direct parent associated with the respective inheritance cluster and linking the cluster to the upper levels in the S-tree.

Figure 3:
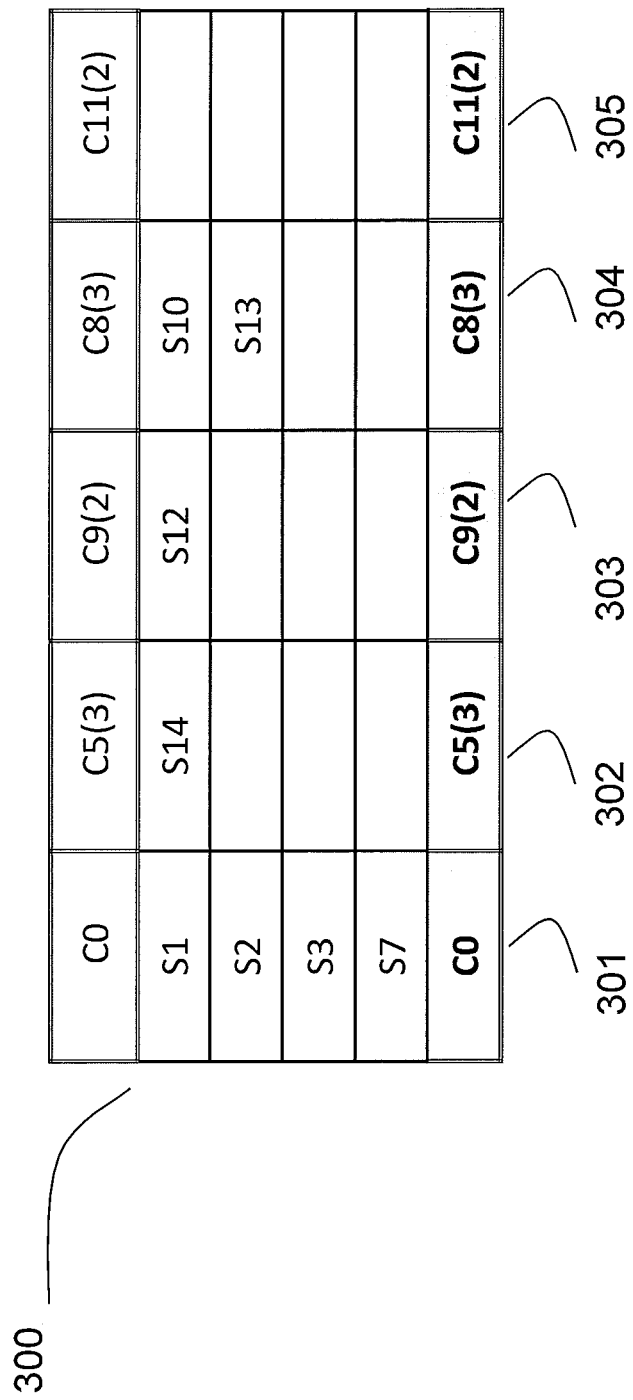
FIG. 3 illustrates an exemplarily clone line table corresponding to the exemplary S-tree illustrated in FIG. 2.
Figure 4:
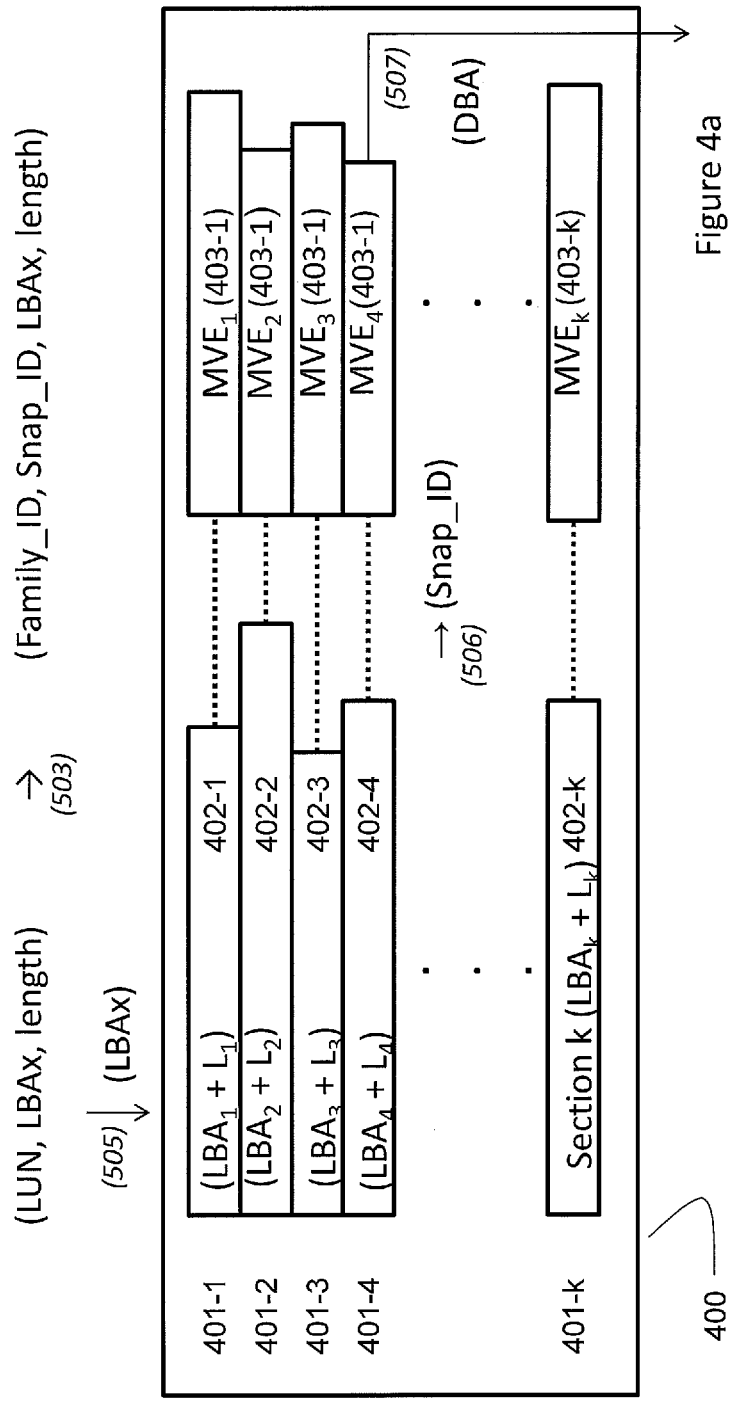
FIG. 4a illustrates a snapshot family mapping data structure configured in accordance with certain embodiments of the presently disclosed subject matter.
FIG. 4b illustrates an exemplary MVE data structure corresponding to a given LBA range in the snapshot family illustrated in FIGS. 2 and 3.

An exemplary clone line table 300 corresponding to the S-tree 200 is illustrated in FIG. 3. The numbers in brackets in the first elements of the clone lines are indicative of direct parents of respective parent clones.

For example, the clone line 301 corresponds to the inheritance cluster 210. The clone line comprises the master volume C0 as a parent clone and the read-only snapshots S1, S2, S3 and S7 being the direct children of the master volume. The snapshot S1 has been created before the snapshot S2; the snapshot S3 has been created after the snapshot S2 but before the snapshot S7. The clone line 302 with the parent clone C5 further comprises the read-only snapshot S14. The value in brackets indicates that the clone C5 is the direct child of S3. The clone line 303 with the parent clone C9 comprises the read-only snapshot S12. The value in brackets indicates that the clone C9 is the direct child of S2. The clone line 304 with the parent clone C8 corresponds to the inheritance cluster 220 and further comprises the read-only snapshots S10 and S13 being the direct children of the clone C8. The value in brackets indicates that the clone C8 is the direct child of S3. The clone line 305 with the parent clone C11 does not comprise any direct child. The value in brackets indicates that the clone C11 is the direct child of S2.

Optionally, in addition to the sequence of a parent clone and its read-only children, a clone line can be configured to comprise the parent clone also as a last element, thereby enabling traversing the table in a hierarchical manner. It is appreciated that throughout the following specification a parent clone is considered as a first and a last element in a respective clone line.

Likewise the S-tree, the clone-line table is updated (e.g. by the snapshot management module) each time a snapshot in the family is created, removed or restored.

FIG. 4a illustrates a snapshot family mapping data structure (referred to hereinafter also as SFM data structure or SFM) configured in accordance with certain embodiments of the presently disclosed subject matter.

Each snapshot family is provided (e.g. by the allocation module 109 in cooperation with the snapshot management module 105) with a snapshot family mapping data structure assigned thereto. Family_ID of a snapshot family is also indicative of the assigned SFM data structure.

For each access request addressed to a member of given snapshot family, the SFM data structure is operable to provide mapping between the request (LUN, LBAx, length) specifying an addressed LUN, an offset $LBA_x$ and a length of the required LBA range and physical addresses corresponding to the request. Thus, the entire snapshot family is mapped to physical addresses corresponding to different family members with the help of the SFM data structure associated with that family.

In accordance with certain embodiments of the presently disclosed subject matter, each family is characterized by a snapshot family logical address space (also referred to hereinafter as SF logical address space). The size of SF logical address space is equal to the size of any of the family members' logical volumes, while a given offset in the SF logical address space corresponds to the same offset in any one of the family member volumes. By way of non-limiting example, an offset LBAx in the SF logical address space corresponds to offset LBAx in an access request (LUN1, LBAx, length1) addressed to a snapshot family member and to LBAx in an access request (LUN2, LBAx, length2) addressed to another member of the same snapshot family.

The SFM data structure 400 includes one or more entries (illustrated as 401-1-401-k), each entry corresponding to a certain variable-length range of contiguous logical addresses within the SF logical address space. A range of logical addresses is contiguous in a SF logical address space, if this range is contiguous in any one of the members of respective snapshot family. Each mapping entry maps a different range of logical addresses and ranges mapped by different entries may have different sizes.

Each entry is characterized by a value indicative of offset in SF logical address space and length of a contiguous LBA range corresponding to the entry (illustrated, respectively, as 402-1-402-k) within the snapshot family logical address space. For example, a certain entry can correspond to logical address range 0-64 Kbyte (i.e. address range of 64K length with zero offset in the SF logical address space), while the next entry can correspond to the logical address range 64 Kbyte-1024 Kbyte (i.e. address range of 960K length with offset=64K in the SF logical address space). It is noted that lengths of contiguous LBA ranges corresponding to the entries are defined in multiples of fixed-length (e.g. 64 Kb) LBA data range. For purpose of illustration only, the access operations are further described herein in terms of entire data portions being multiples of the data blocks corresponding to this fixed-length LBA data range. Those skilled in the art will readily appreciate that the teachings of the presently disclosed subject matter are applicable in a similar manner to partial data portions.

Each entry is further configured to comprise one or more mappings for mapping an LBA range associated with the mapping entry into one or more physical address ranges respectively correlated to one or more members of the snapshot family. Each of the mappings correlates a physical address range to a member of the family, for example, by including in the mapping entry a tuple of physical address range and the correlated member. Other correlation techniques may be used, for example: the mapping entry can include a list of physical address ranges and a bitmap that indicates which family member has a corresponding physical address range, for example, a set bit indicates that the corresponding member is correlated with a physical address range that is included in the entry, wherein the first set bit correlates the corresponding member to the first physical address range in the list of physical address ranges.

By way of non-limiting example, the mappings for a given entry can be provided by a data structure (illustrated, respectively, as 403-1-403-k) associated with the entry and configured to provide mapping between LBA range corresponding to the entry and range of physical addresses assigned to different members of the snapshot family. Such data structure is referred to hereinafter as a multiple value entry (MVE) data structure or MVE.

As will be detailed further with reference to FIG. 4b, a given MVE data structure 403-k provides, for contiguous LBA range 402-k in a SF logical address space, association between members in the snapshot family and values indicative of DBA ranges assigned to these members.

The length of the contiguous LBA range can vary from entry to entry in the SFM data structure. The length of contiguous LBA range in a given entry and/or its offset in SF logical address space can also vary depending on different (e.g. write, delete, etc.) operations provided with regard to the logical address space of the snapshot family. Responsive to transferring a certain LBA range from one SFM entry to another, respective Snap_ID→DBA mapping data can be transferred to MVE data structure associated with another SFM entry.

Figure 5:
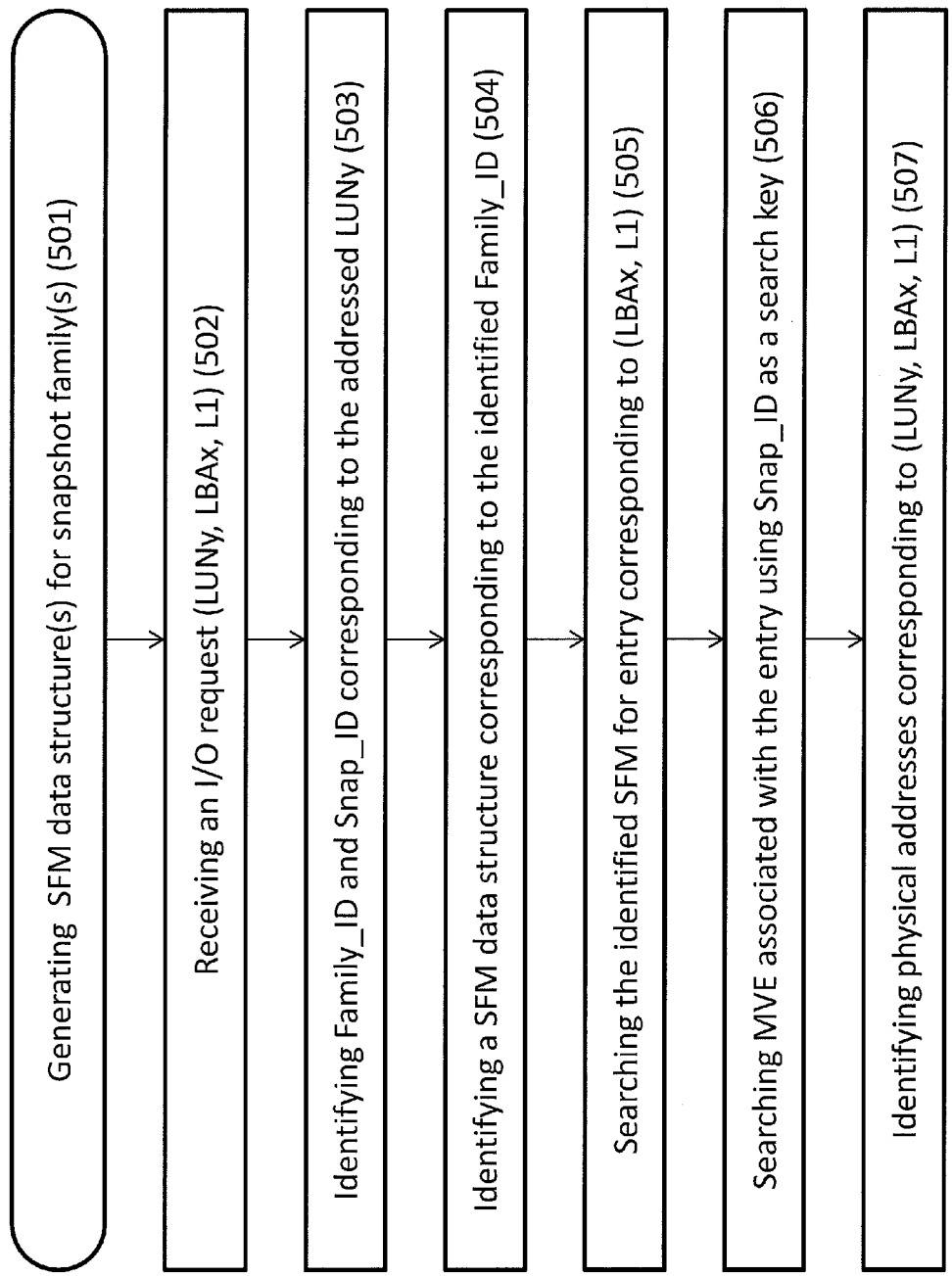
FIG. 5 illustrates a generalized flow chart of identifying physical addresses of data specified in an I/O request addressed to a given LUN in accordance with certain embodiments of the presently disclosed subject matter.

Referring to FIG. 5, there is illustrated a generalized flow chart of identifying physical addresses of data specified in an access request addressed to a given LUN in accordance with certain embodiments of the presently disclosed subject matter.

Each snapshot family is provided (e.g. by the allocation module 109 in cooperation with the snapshot management module 105) with a corresponding SFM data structure. Upon receiving an access request (LUNy, LBAx, L1) (502) addressed to a snapshot family member corresponding to LUNy, the control layer (e.g. using the snapshot management module 105) identifies (503) Family_ID and Snap_ID corresponding to the addressed LUNy. It is noted, that access request can be addressed only to snapshots with assigned LUNs.

The control layer further identifies (e.g. using the allocation module 109) a snapshot family mapping data structure corresponding to the identified Family_ID (504) and uses the LBA range specified in the request for searching (505) the identified SFM for entry corresponding to this LBA range (i.e. entry corresponding to the range LBAx, L1 within the SF logical address space).

For purpose of illustration only, in the following description access requests are addressed to LBA ranges corresponding to a single SFM entry. Those skilled in the art will readily appreciate that the teachings of the present disclosure are applicable in a similar manner to any addressed LBA range (e.g. an access request addressing LBA ranges in several SFM entries can be handled as several access requests, each addressing LBA range in a single entry).

The control layer further uses Snap_ID as a key for searching (506) MVE associated with the found entry for identifying (507) the physical addresses corresponding in the addressed member of the snapshot family to the requested LBA range. By way of non-limiting example, searches 505, 506 and 507 can be provided by the allocation module 109.

Referring back to FIG. 4a, by way of non-limiting example, a snapshot family mapping data structure can be configured as a mapping tree. The mapping tree can be configured as an ordered tree data structure comprising one or more leaves. For example, the tree can be configured in a manner detailed in US Patent Application No. 2011/0082997 assigned to the Assignee of the present application and incorporated herewith by reference in its entirety. A depth of a leaf in the tree can represent a length of contiguous range of logical addresses represented by the leaf, a path followed from a tree root to the leaf can indicate an offset of the range of addresses within the snapshot family logical address space; and MVE associated with the leaf can indicate corresponding DBA ranges assigned to different members of the snapshot family. Accordingly, the control layer can traverse the tree in order to find a leaf corresponding to the requested LBA range and further use MVE associated with the leaf for identifying DBA range corresponding to the addressed Snap_ID.

Referring to FIG. 4b, there is illustrated an exemplary MVE corresponding to a given LBA range in the snapshot family illustrated with reference to FIGS. 2 and 3.

The illustrated MVE data structure 404 provides, for a given LBA range, association between two multi-value entries: snapshots entry 405 comprising values (e.g. respective Snap_ID) indicative of members in the snapshot family and physical storage entry 406 comprising values indicative of DBA ranges corresponding to the values in the snapshots entry 405.

A given physical address range can be shared by more than one family member. Each value in the physical storage entry 406 corresponds to a physical address range assigned to one or more snapshot family members sharing the same physical addresses corresponding to the given LBA range.

The MVE data structure can be configured to present a given DBA range by one or more family members (referred to hereinafter as representative members) sharing the given DBA range, whilst to omit from the snapshot entry at least one family member (referred to hereinafter as an omitted member) sharing the given DBA range and different from any of the representative members.

In accordance with certain embodiments of the presently disclosed subject matter, the MVE data structure can be configured to provide uniqueness of presenting a given DBA range, i.e. the given DBA range shared by several family members is presented in the MVE data structure only once in association with one and only one family member among the family members sharing the respective DBA range. The rest of the family members sharing the same DBA range can be identified in accordance with pre-defined rules by using the MVE and data informative of the hierarchical and sequential relationship of the members in the snapshot family (e.g. S-tree and/or clone lines data structures).

For example, if all members sharing the same range of physical addresses are members of the same inheritance cluster (e.g. comprised in the same clone line), the snapshot entry of MVE data structure can include only the earliest created among them. If the members sharing the same range of physical addresses belong to a different inheritance cluster (e.g. comprises different clone lines), the snapshot entry of MVE data structure includes only the latest created member in the earliest created (i.e. upper layer) inheritance cluster.

In the illustrated non-limiting example, the master volume C0 has been modified after creation of the snapshots S1, S2 and S3 in the clone line 301, while there was no further modification of the master volume upon creating the snapshot S7. Accordingly, the snapshot S7 shares the range of physical addresses with the master volume C0, and snapshot entry 405 of the illustrated MVE data structure 404 does not comprise value indicative of S7, and a request addressed S7 or C0 will be mapped to the same DBA6 range.

In the illustrated non-limiting example, the parent clone C8 has been modified after the snapshot S13 has been created. The value in the physical storage entry corresponding to S13 (specified as "pass") is indicative that the respective snapshot does not share data with the modified parent and DBA range corresponding to the snapshot is presented by a snapshot from an upper level inheritance cluster.

In the illustrated example the physical address range corresponding to snapshot S1 has been unmapped (or, optionally, has been never written or allocated). The corresponding value in the physical storage entry is specified as "free".

Those versed in the art will readily appreciate that uniqueness of presenting a shared DBA range in MVE by one and only one family member among the family members sharing the same DBA range can be implemented in a manner other than illustrated with reference to FIG. 4b.

FIGS. 6a-6j illustrate non-limiting examples of evolution of SF relationship data structures (illustrated by S-trees 601-1-601-10 and a clone line tables 603-1-603-10), and SF mapping data structures (illustrated by mapping tables 604-1-604-10 indicative of DBA assignments for family members and MVE data structures 605-1-605-10) in correspondence with events related to the snapshot family and illustrated in a timeline of events (from 602-1 to 602-10). It is noted that a given mapping table represents all family members corresponding to specified DBA range and is used for illustration only, while corresponding MVE data structure enables uniqueness of presenting a given shared DBA range by one and only one family member and is a part of SFM data structure stored and maintained in the storage system. In a mass-storage system a snapshot family can comprise thousands, or even several thousands of snapshots. Using the MVE data structure (preferably MVE data structure with uniqueness of presenting a given shared DBA range) instead of a mapping table representing all family members allows increasing effectiveness of snapshot management.

The illustrated events include creating of new snapshots and operations related to writing to the cache memory and to the physical address space (destaging).

Figure 6A:
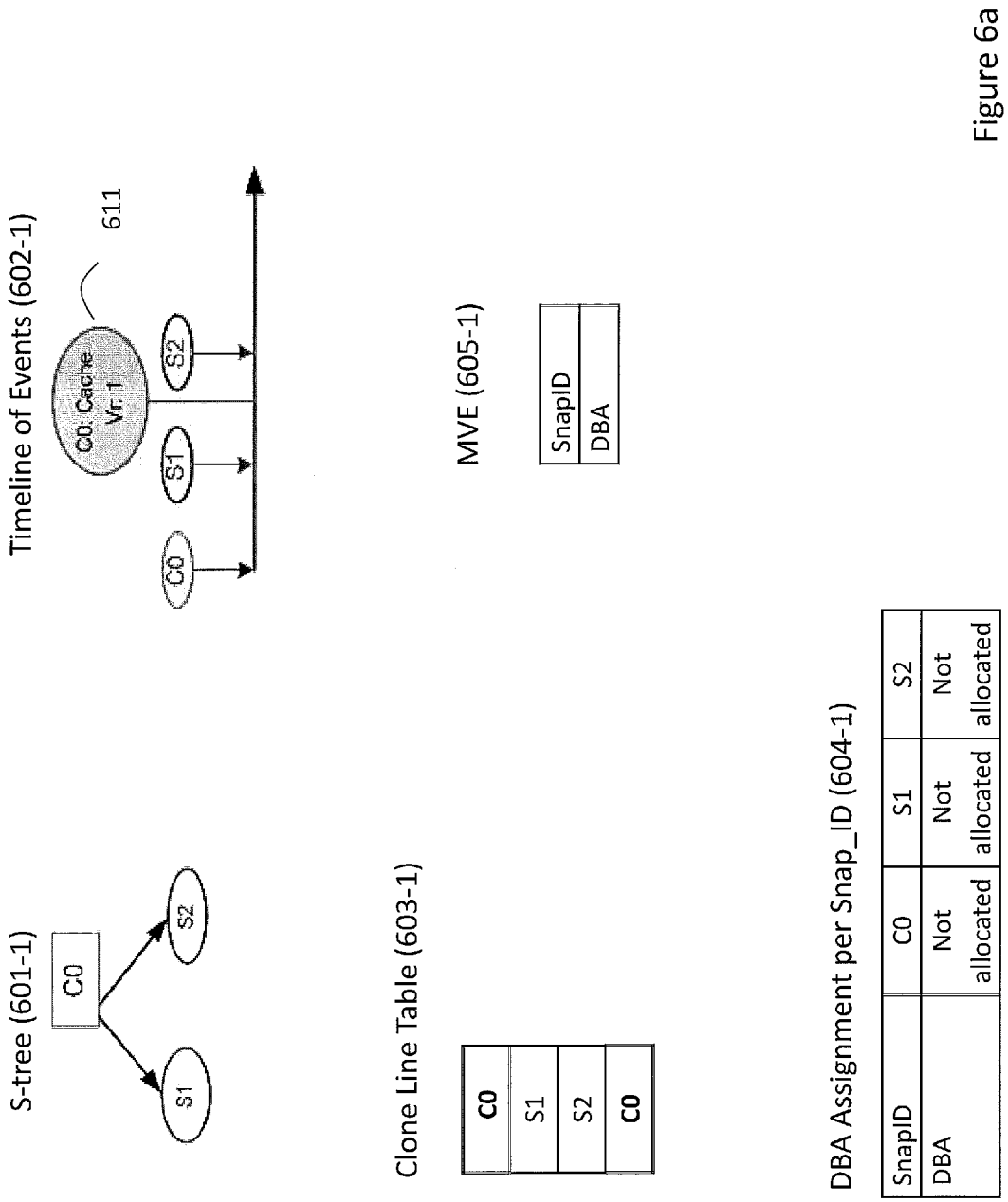
FIGS. 6a-6j illustrate non-limiting examples of evolution of an S-tree, a clone line table and of MVE data structure in correspondence with events related to the snapshot family illustrated in FIGS. 2-3.

In accordance the timeline 602-1 illustrated in FIG. 6a, after creating the read-only snapshot S1 of the master volume C0, the control layer receives a write request addressed to the master volume. The write request specifies the addressed family member (C0 in the illustrated example). The control layer enables writing data (event 611) to the cache memory.

In accordance with certain embodiments of the presently disclosed subject matter, the control layer is configured (e.g. with the help of the snapshot management module) to recognize a current snapshot identifier indicative of the most recent snapshot and to associate data to be cached with the latest snapshot identifier existing at the time of writing a given data portion to a cache memory. Such snapshot identifier associated with the cached data is referred to hereinafter as Snap_version of the cached data. Thus, data cached in the cache memory is associated with an indication of the addressed snapshot family, snapshot family member and with Snap_version value indicative of the latest snapshot existing at the time of writing a given data portion to a cache memory.

In the non-limiting example illustrated in FIG. 6a, the data written to the cache memory is associated with the indication of Snap_version=1 (denoted as Vr.=1) as, at the moment of writing, the latest created snapshot (i.e. snapshot S1) had Snap_ID=1. Snapshot S2 is created after writing the data 611 to the cache memory. The illustrated in FIG. 6a stage does not comprise destaging data from the cache memory to the physical storage space. Accordingly, no DBA allocation has been provided, and the mapping table 604-1 and MVE data structure 605-1 are empty. The S-tree 601-1 and the clone line table 603-1 represent the snapshot family at the end of the illustrated stage.

Figure 6B:
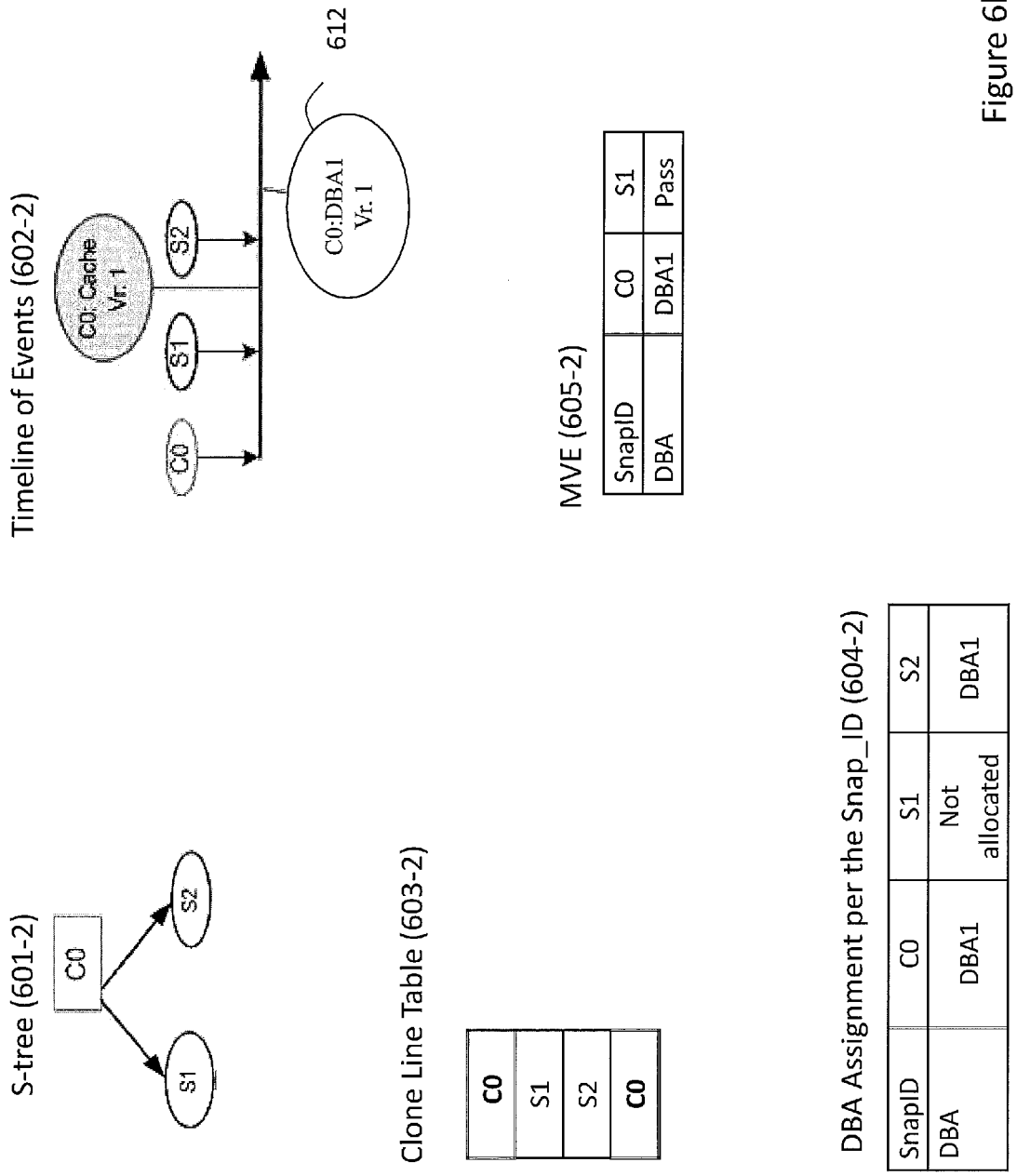

Referring to FIG. 6b, as illustrated in the timeline 602-2, data 611 cached in the cache memory has been destaged to the physical address range DBA1 (event 612: destage (C0: DBA1, vr.1)). No changes have been provided in S-tree 601-2 and in clone line table 603-2. As illustrated in the mapping table 604-2, since C0 has been modified after creation of S1 and before S2 creation, there is no DBA assigned to S1, while S2 shares the same DBA1 range as the master volume C0. Accordingly, snapshot entry of the MVE data structure 605-1 does not comprise Snap_ID=2. C0 represents DBA1 for both the master volume as well as the omitted member S2. Since no data has been written to S1, the value corresponding to Snap_ID=1 is specified in the physical storage entry as "pass".

Figure 6C:
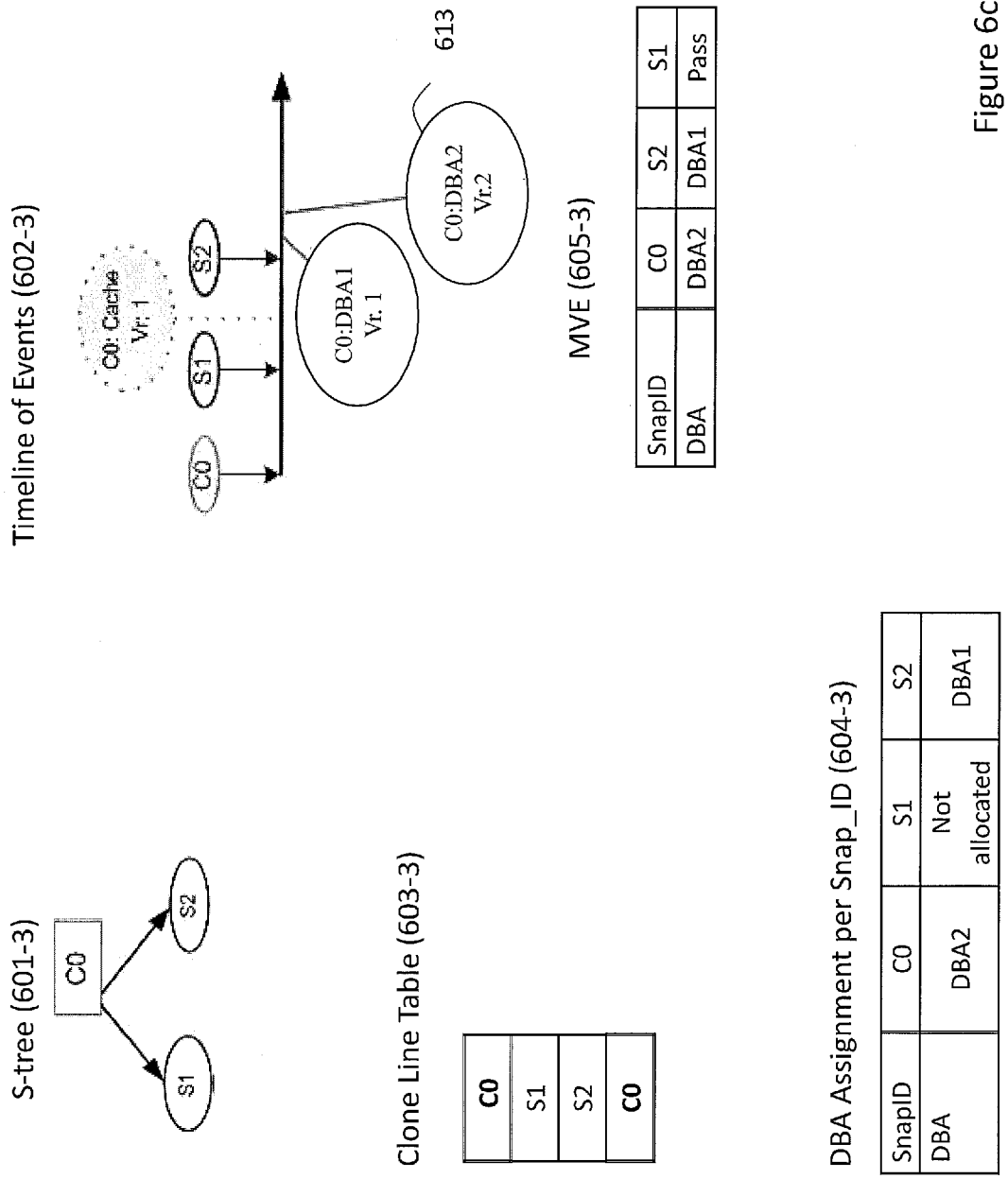

At the stage illustrated in FIG. 6c, after creating the snapshot S2, the control layer has received a new write request addressed to the master volume C0, and new data associated with Snap_version=2 has been written (not illustrated) to the cache memory and has been destaged to the physical address range DBA2 (event 613, destage (CO: DBA2, vr.2)). No changes have been provided in S-tree 601-3 and in clone line table 603-3. As illustrated in the mapping table 904-3, DBA assigned to C0 is changed to DBA2, while DBA assigned to S2 continues to be in DBA1. Since C0 and S2 no longer share the same DBA, C0 cannot represent the DBA for S2 and S2 has to be included in the MVE. Thus snapshot entry in MVE data structure 605-3 comprises value Snap_ID=2 with corresponding value DBA1 in the physical storage entry.

Figure 6D:
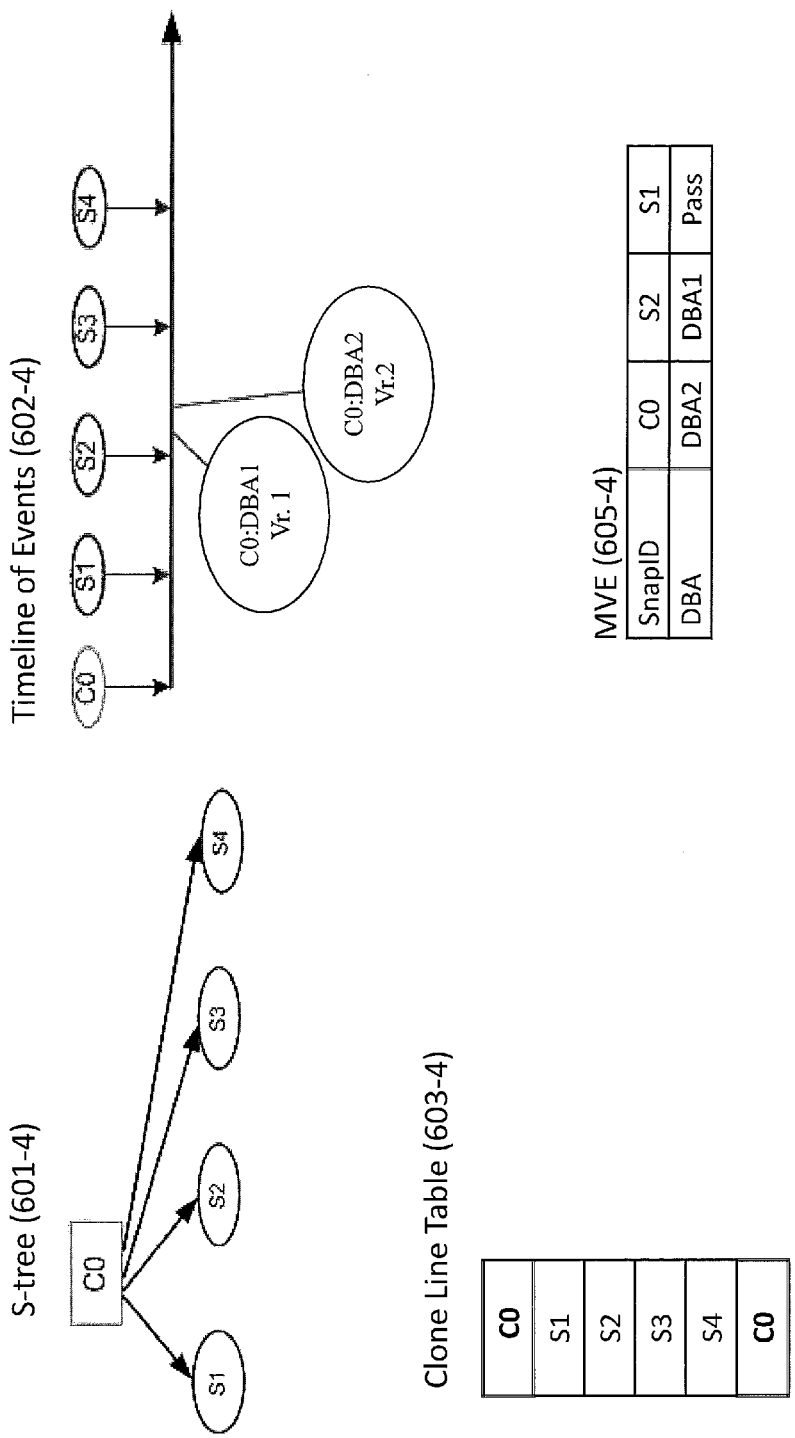

Referring to FIG. 6d, as illustrated in the timeline 602-4, new snapshots S3 and S4 have been created. S-tree 601-4 and clone line table 602-4 have been updated accordingly to present the newly created snapshots as direct children of the master volume C0. As illustrated in the mapping table 604-4, the new snapshots correspond to the same DBA2 range as the master volume C0. Accordingly, snapshot entry of the MVE data structure 605-2 does not comprise entries for Snap_ID=3 and Snap_ID=4, and respective snapshots can be looked up in accordance with the clone line. Thus, the MVE data structure is not modified, the newly created SF members are omitted in MVE and yet DBA2 range is represented in the MVE by the master volume C0.

Figure 6E:
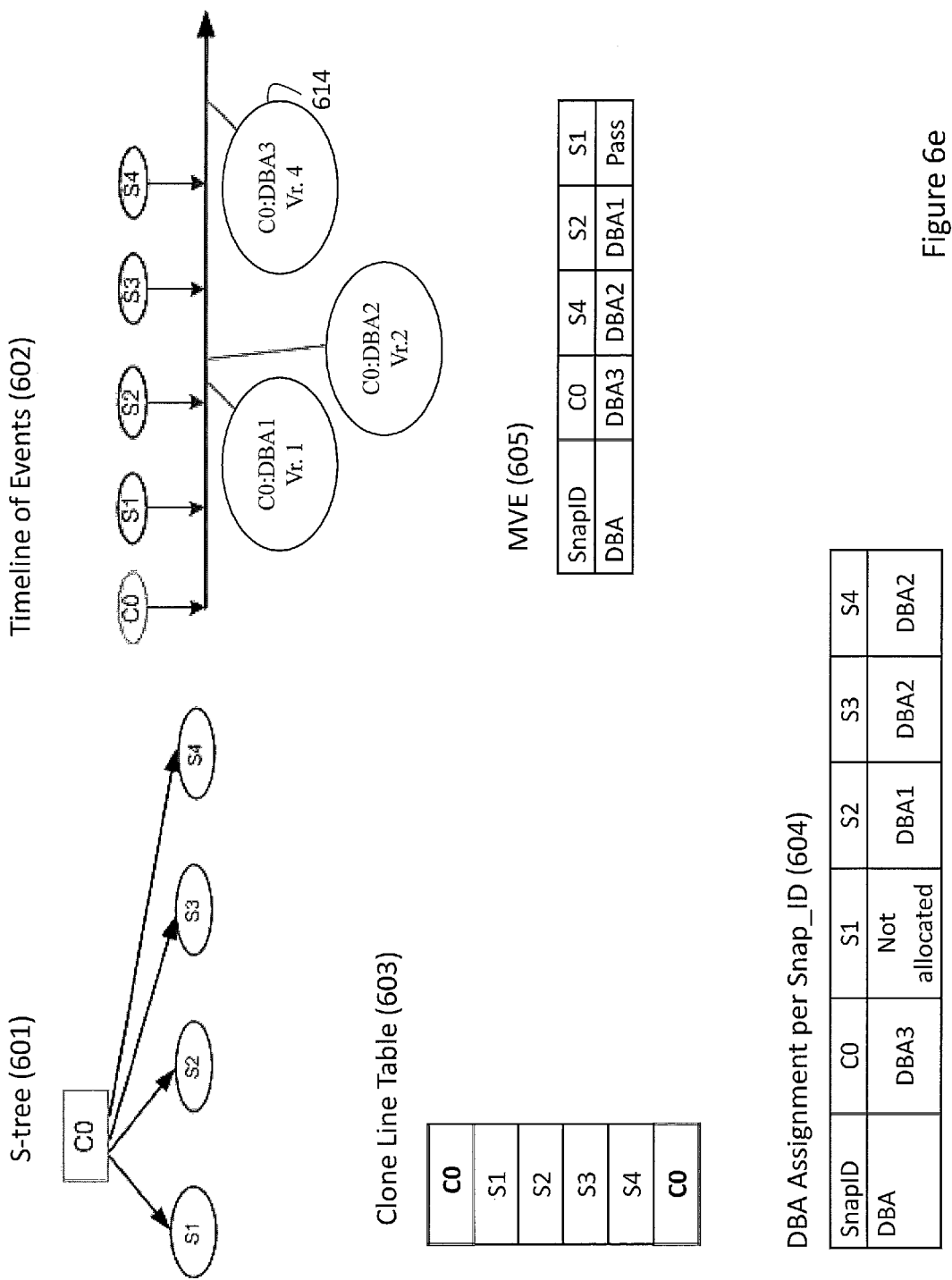

Referring to FIG. 6e, as illustrated in the timeline 602-5, after creating the snapshot S4, the control layer has received a new write request addressed to the master volume C0, new data associated with Snap_version=4 has been written (not illustrated) to the cache memory and has been destaged to the physical address range DBA3 (event 614, destage (CO: DBA3, vr.4)). No changes have been provided in S-tree 601-5 and in clone line table 603-5. As illustrated in the mapping table 604-5, DBA assigned to C0 is changed to DBA3, while S3 and S4 continue to share DBA2. Since C0 no longer shares DBA range with the snapshots S3 and S4, the snapshot entry in MVE data structure 605-5 comprises value Snap_ID=4 (among S3 and S4, the snapshot S4 is the latest in the clone line) with corresponding value DBA2 in the physical storage entry.

It is noted that snapshots with Snap_ID smaller or equal to Snap_version of a destage data are not affected by such destaging.

Figure 6F:
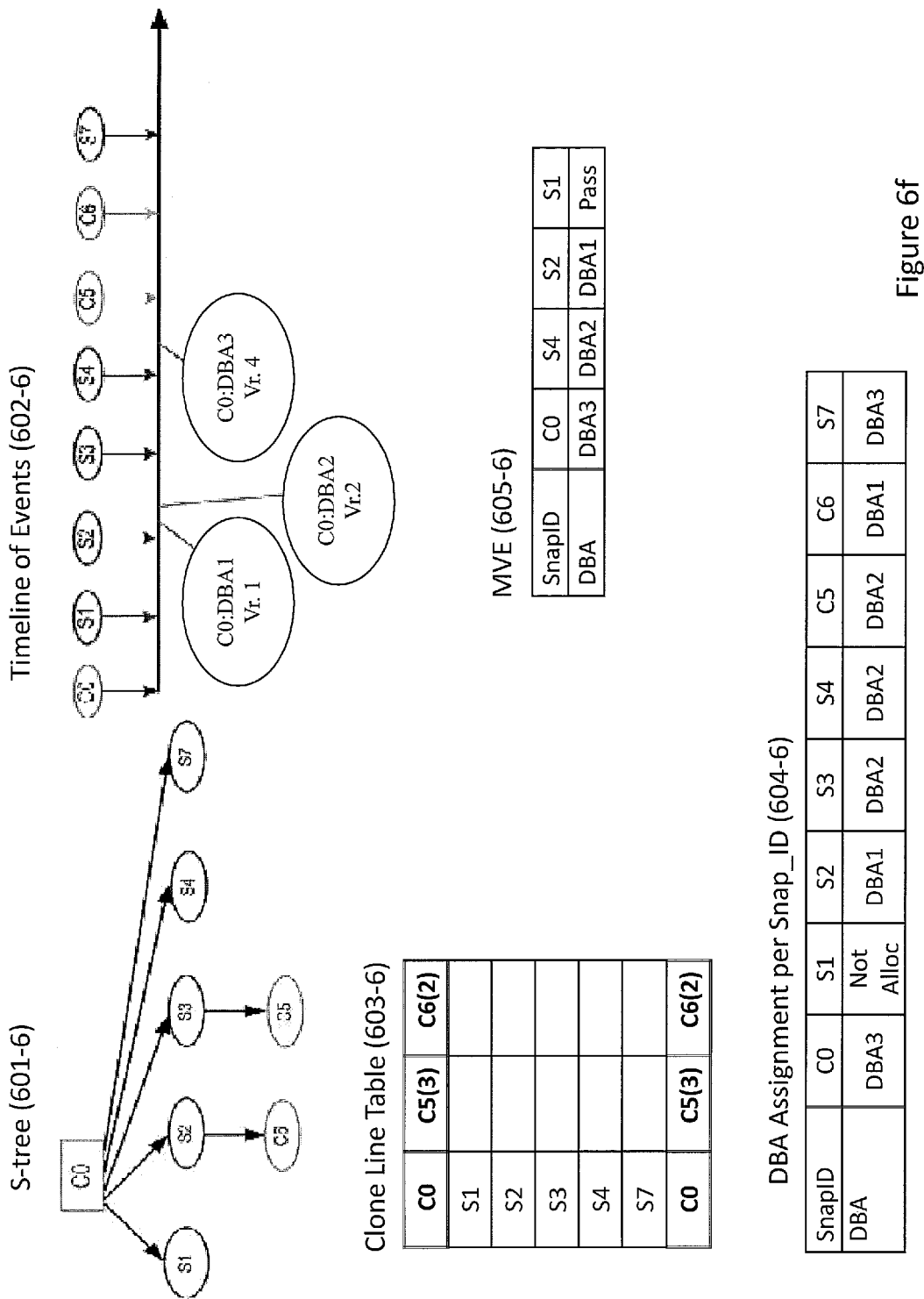

Referring to FIG. 6f, as illustrated in the timeline 602-6, new clones C5 and C6 and the read-only snapshot S7 have been created. The S-tree 601-6 and the clone line table 603-7 have been updated accordingly to present the newly created clone C5 as direct child of S3, clone C6 as direct child of S2 and the snapshot S7 as direct child of the master volume C0. C5 shares DBA2 range with its parent S3 and with S4. The value DBA2 in the physical storage entry of the MVE should have uniqueness representation, i.e. to correspond to one and only one Snap_ID among the members sharing the same DBA range. As presented by way of non-limiting example in MVE data structure 605-6, this only one member is selected among the sharing members as the last member in the earliest clone line, i.e. S4. When the control layer looks up and does not find C5 in the MVE, it looks for its parent S3. When S3 is also not found, the control layer searches down the clone line comprising S3 (i.e. the clone line with C0 as a parent clone) and finds S4 sharing the same DBA2 range with C5 and presented in the MVE.

The new clone C6 shares DBA1 with its parent S2, which is already represented in the MVE 605-6, thus need not be added to the MVE. Likewise, the new snapshot S7 shares DBA3 with its parent C0, which is already represented in the MVE 605-6, thus need not be added to the MVE data structure.

Figure 6G:
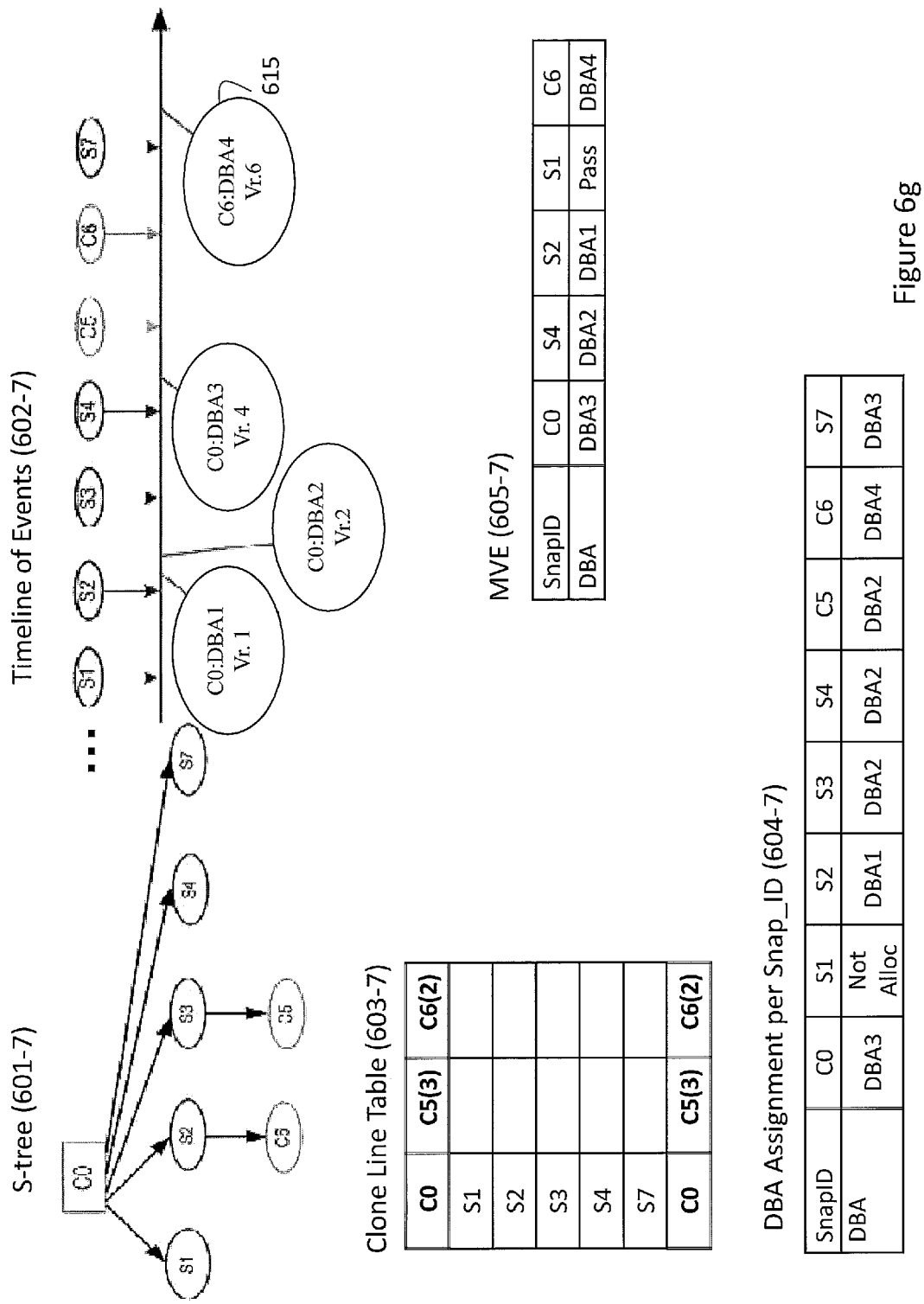

Referring to FIG. 6g, as illustrated in the timeline 602-7, after creating the clone C6 and before creating the snapshot S7, the control layer has received a new write request addressed to the clone C6, new data has been Written (not illustrated) to the cache memory (bearing indication of Snap_version=6) and has been destaged to the physical address range DBA4 (event 615, destage (C6: DBA4, vr.6)) after creating the snapshot S7. No changes have been provided in S-tree 601-7 and in clone line table 603-7. As illustrated in the mapping table 604-7, DBA assigned to C6 is changed to DBA4. Accordingly, upon destaging, the snapshot entry in MVE data structure 605-7 is updated to include value Snap_ID=6 with corresponding value DBA4 in the physical storage entry.

Figure 6H:
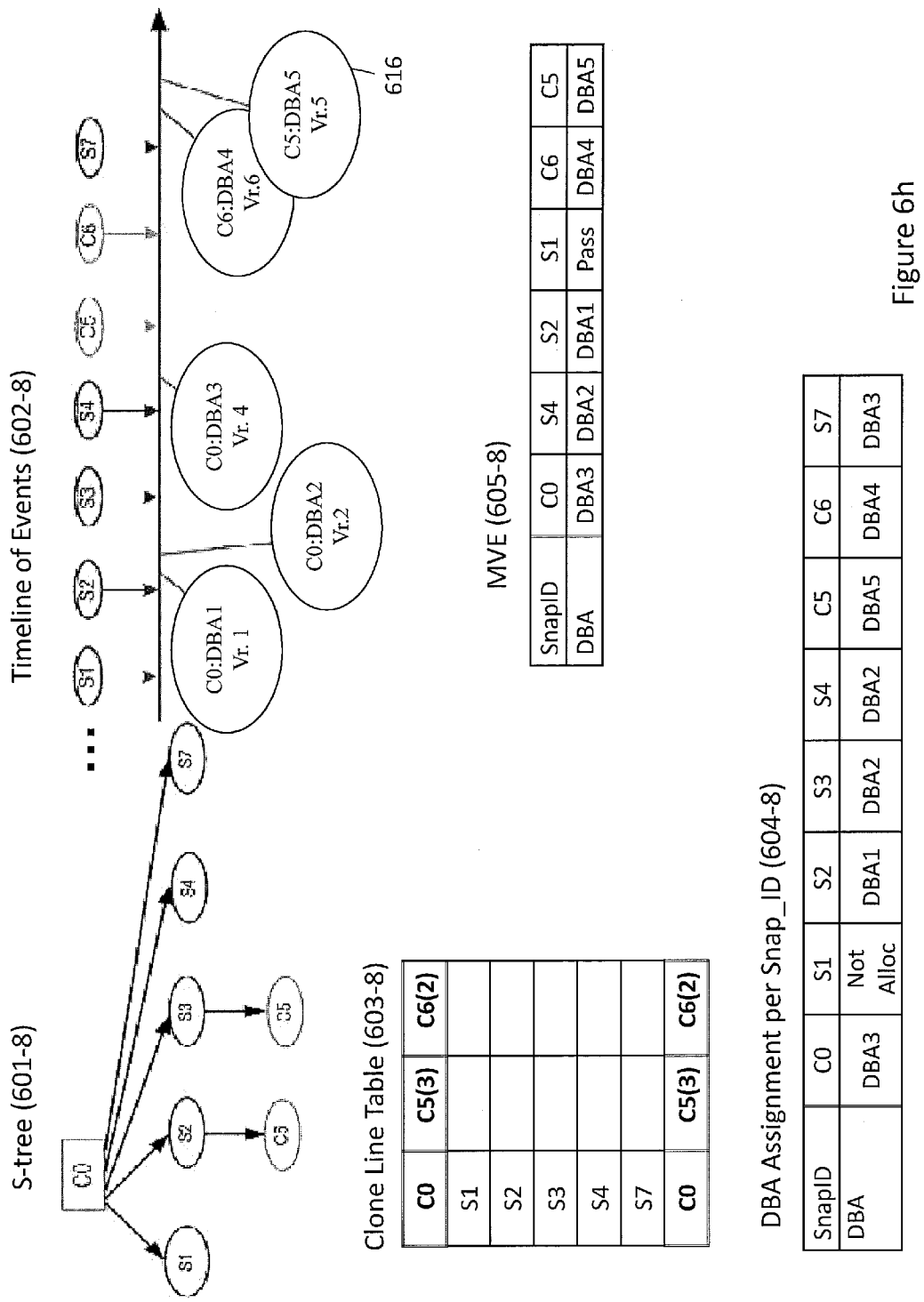

Likewise, as illustrated in FIG. 6h, after creating the clone C5 and before creating the clone C6, the control layer has received a new write request addressed to the clone C5, new data has been written (not illustrated) to the cache memory (bearing indication of Snap_version=5) and has been destaged to the physical address range DBA5 (event 616, destage (C5: DBA5, vr.5)) after creating the snapshot S7. No changes have been provided in S-tree 601-8 and in clone line table 603-8. As illustrated in the mapping table 604-8, DBA assigned to C5 is changed to DBA5. Accordingly, upon destaging, the snapshot entry in MVE data structure 605-8 is updated to include value Snap_ID=5 with corresponding value DBA5 in the physical storage entry.

Figure 6I:
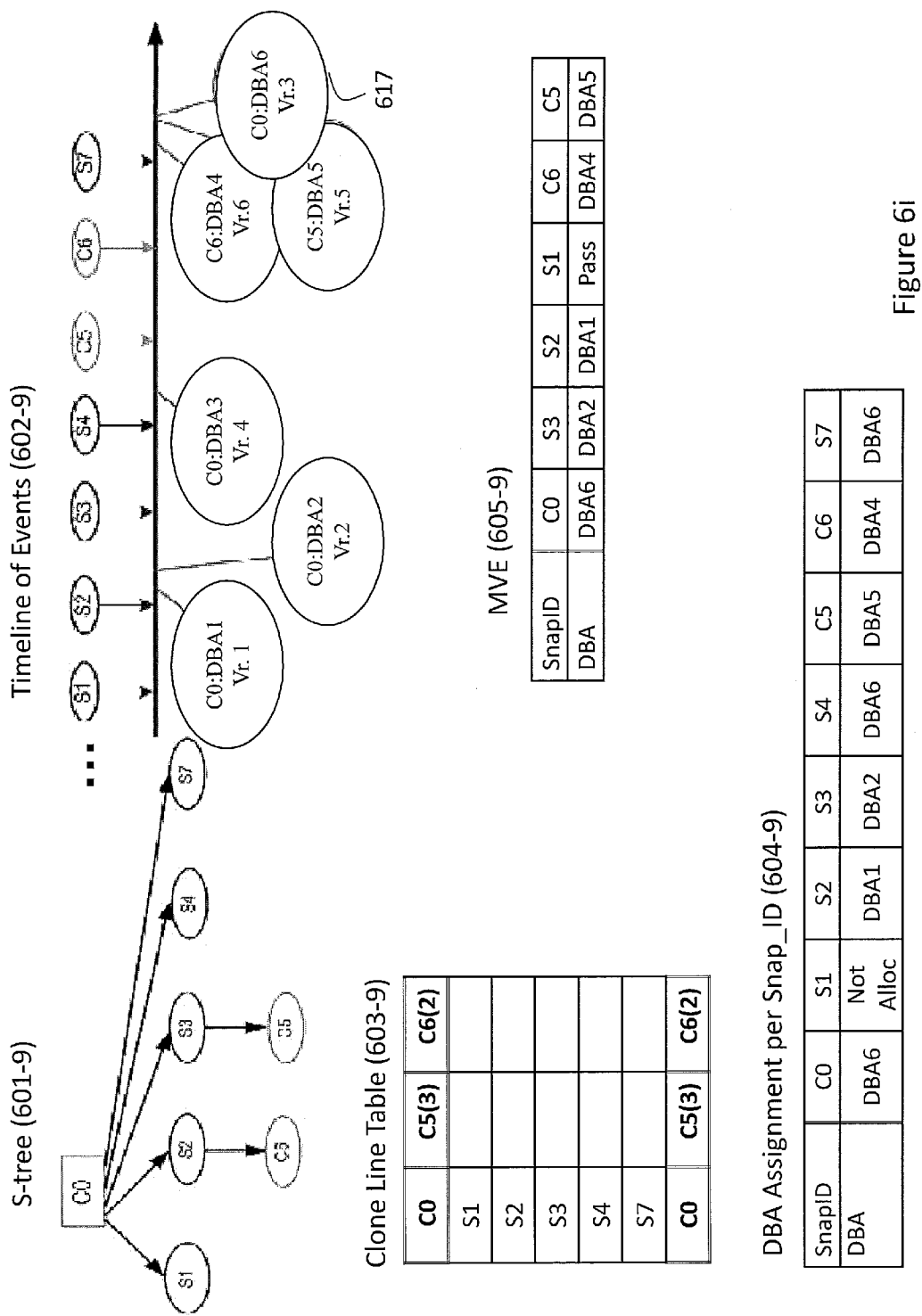

Referring to FIG. 6i, as illustrated in the timeline 602-9, upon creating the snapshot S3 and before creating the snapshot S4, the control layer has received a new write request addressed to the master volume C0, new data has been written (not illustrated) to the cache memory (bearing indication of Snap_version=3) and has been destaged to the physical address range DBA6 (event 617, destage (C0: DBA6, vr. 3)) after creating the snapshot S7. No changes have been provided in S-tree 601-9 and in clone line table 603-9.

As several snapshots have been created between writing data to the cache and destaging therefrom, the control layer needs to update the MVE 605-9 accordingly. The received write request can affect the members created after S3 and not modified before the destaging event 617, i.e. the snapshots S4 and S7. Accordingly, as illustrated in the mapping table 604-9, upon destaging, S4 and S7 share DBA6 with the master volume C0. Before the destage event 617, the snapshot S4 shared DBA2 with S3, and DBA2 was presented in the MVE 605-8 by Snap_ID=4. Since, upon the destage event 617, the snapshots S4 and S7 share DBA6 with the master volume (the latest element in the respective clone line), the snapshot entry in MVE data structure 605-9 is updated to exclude S4 and to include S3 as corresponding to the range DBA2.

As illustrated, the DBA range corresponding to S4 has been changed with no changes of S4. If an access request addressed to the snapshot S4 arrives before the destage event 617, the request will be served using DBA2 address range.

Figure 6J:
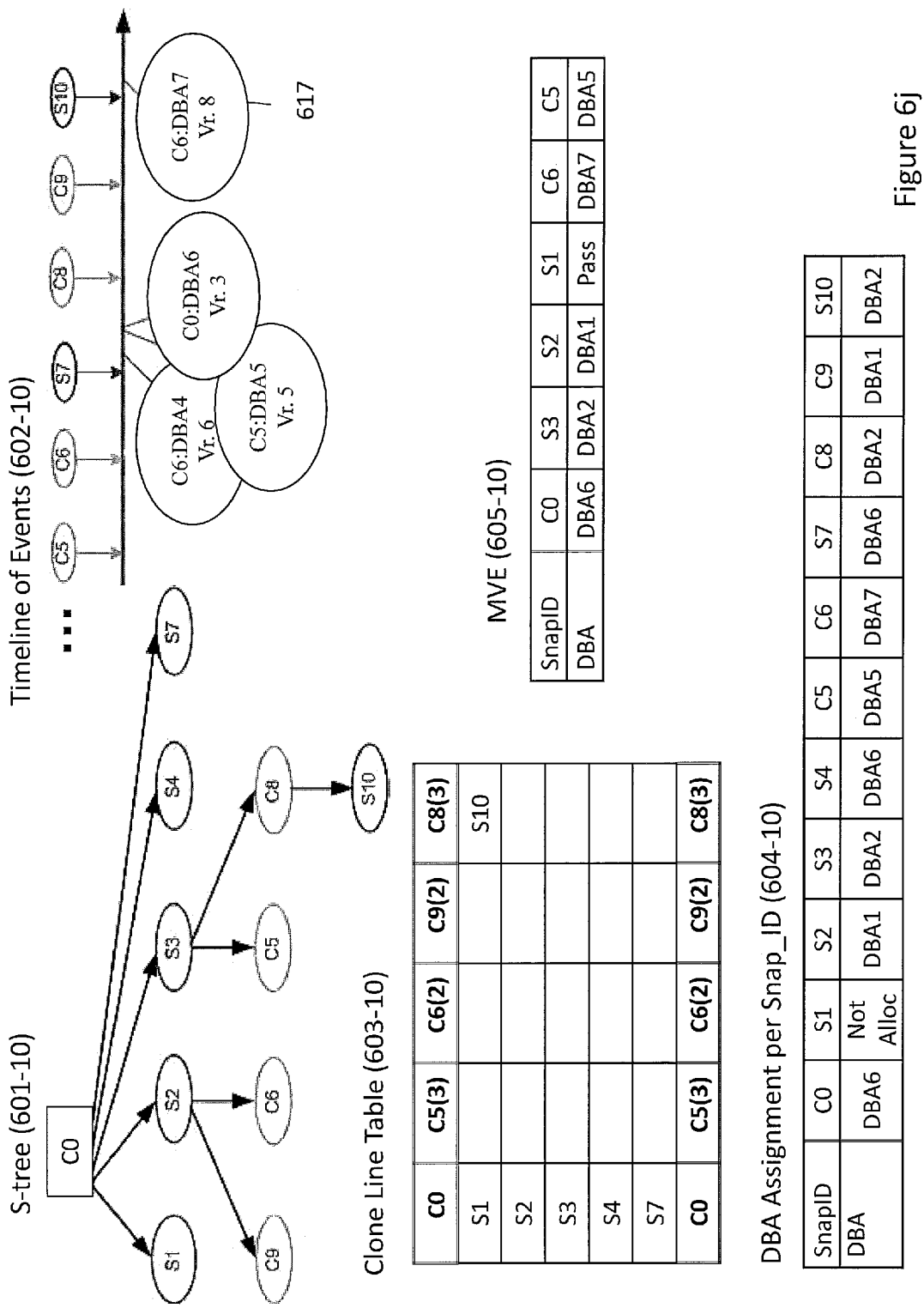

Referring to FIG. 6j, as illustrated in the timeline 602-10, new clones C8 and C9 and the read-only snapshot S10 have been created. The S-tree 601-10 and the clone line table 603-10 have been updated accordingly to present the newly created clone C8 as direct child of S3, clone C9 as direct child of S2 and the snapshot S10 as direct child of the clone C8. As presented in the mapping table, C8 shares DBA2 range with its parent S3 and with its child S10; C9 shares DBA1 range with S2. Upon creating the clone C8 and before creating the clone C9, the control layer has received a new write request addressed to the clone C6, new data has been written (not illustrated) to the cache memory (bearing indication of Snap_version=8) and has been destaged to the physical address range DBA7 (event 618, destage (C6: DBA7, vr. 8)) after creating the snapshot S10. Accordingly, the physical storage entry of the MVE 605-10 is updated so that the value Snap_ID=5 in the snapshot entry corresponds to the value DBA7. Since there is no member corresponding to the range DBA4, this range can be discarded and deleted from the MVE.

SF mapping data structure and elements thereof are updated responsive to different destaging event as, for example, destaging data received in a write request, destaging data in conjunction with snapshots removal, restoring or un-mapping, etc. Thus, among advantages of certain embodiments of the presently disclosed subject matter is independent, whilst coordinated, management of activities within a cache and activities related to the cache.

Different events and processes in the storage system (e.g. migration process, upgrading process, SF member corruption, etc.) can require restoring a certain SF member. For purpose of illustration only, the following description is provided for restoring a corrupted SF member. Those skilled in the art will readily appreciate that the teachings of the present disclosure are applicable in a similar manner to restoring any other writable SF member and to any other purpose of restoring thereof. The terms "corrupted SF member" should be expansively construed to cover a writable SF member comprising at least part of the data which become unusable or unavailable. Corruption may occur, for example, as a result of accidental deletion of data, because of virus infection and/or for any other reason.

Figure 7:
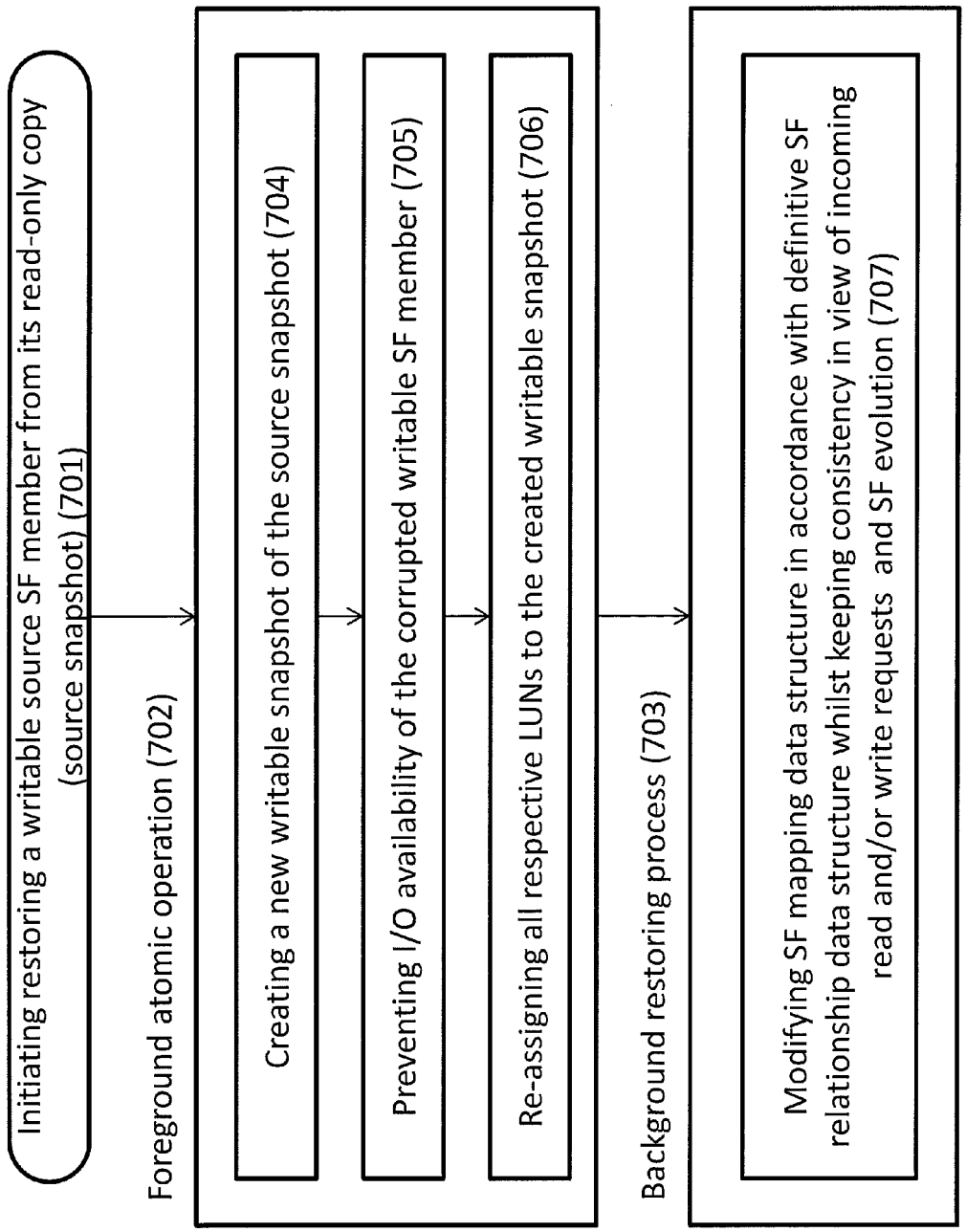
FIG. 7 illustrates a generalized flow chart of restoring a writable SF member from its read-only snapshot in accordance with certain embodiments of the presently disclosed subject matter.
Figure 8D:
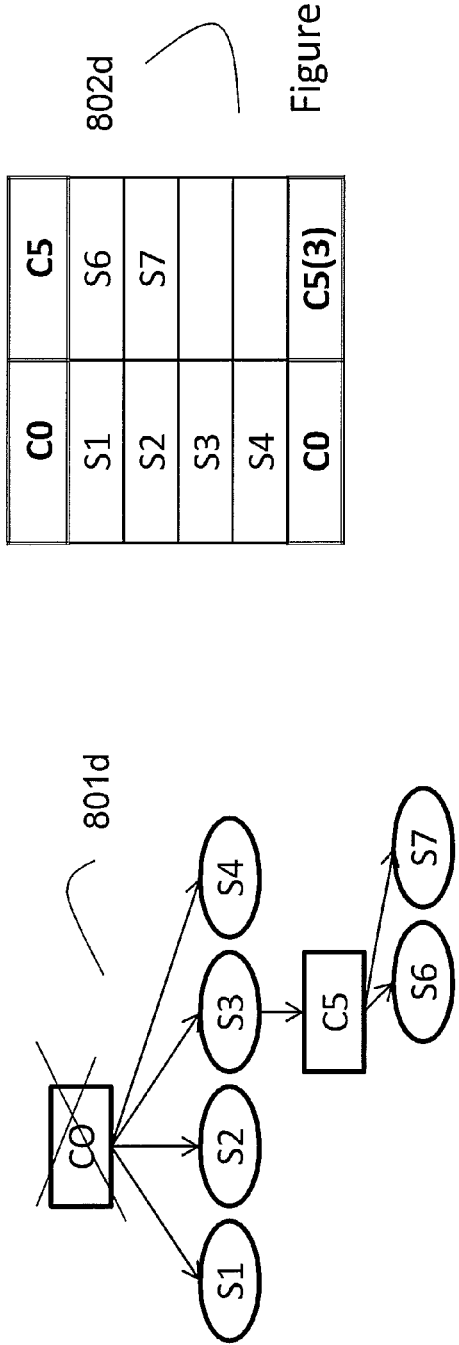
Figure 8E:
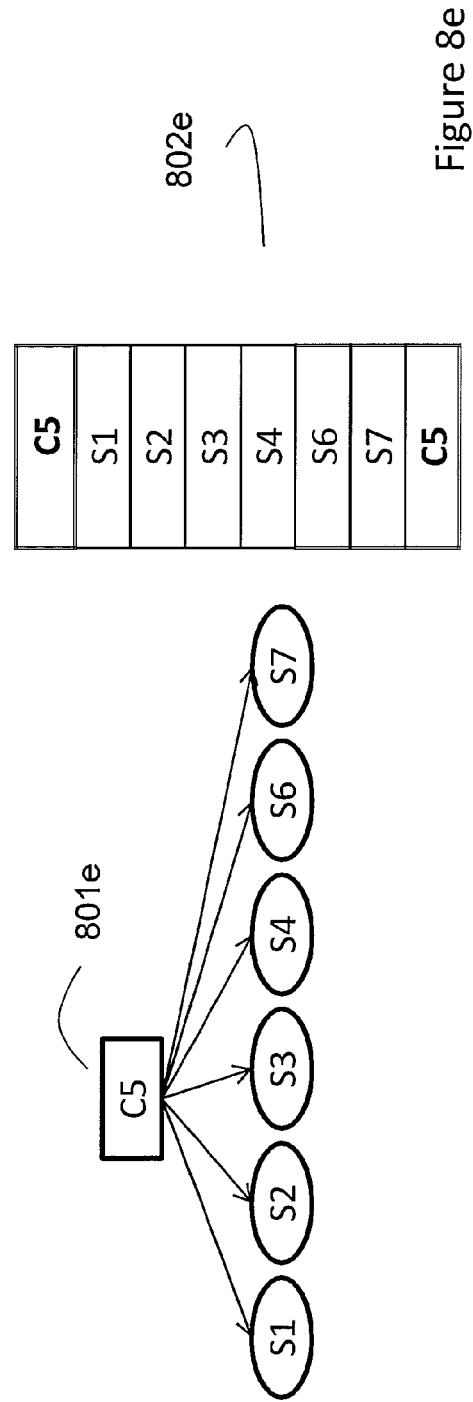

FIG. 7 illustrates a generalized flow chart of restoring a writable SF member from its read-only snapshot. In accordance with certain embodiments of the presently disclosed subject matter, the restoring process comprises a foreground restoring process (702) followed by a background restoring process (703).

Foreground restoring process (702) is initiated (701) responsive to a restoring command received from a requesting entity (e.g. from host or from a storage administrator, human and/or computer-implemented). The restoring command specifies an SF member to be restored and a snapshot from which the data is restored (referred to hereinunder as a source snapshot).

In response to the received restoring command, the control layer generates (704) a new writable snapshot (referred to hereinunder as a destination SF member) of the source snapshot thereby giving rise to the destination snapshot with data identical, when generated, to the source snapshot; updates the SF relationship data structure accordingly and re-assigns to the destination snapshot (706) all LUNs assigned to the corrupted SF member. Optionally, the control layer prevents (705) availability of the corrupted SF member for I/O requests (e.g. by special marking in a volume table, removing from the volume table, etc.).

Operations (704)-(706) are provided as a single atomic operation, i.e. an operation that either succeeds or fails in its entirety and not in a partial way.

Once the above foreground atomic operation is completed, the control layer sends acknowledgement to a predefined destination (e.g. to the requesting entity) indicative of a completion of the restoration, and the storage system can continue its operating by using the destination (i.e. restored) SF member.

FIG. 8a illustrates initial S-tree (801a) and respective clone line table (802a) of an exemplary snapshot family at a start of restoring process; I/O request (803a) to LUN$_x$ assigned to C0 is directed to C0. FIG. 8b illustrates S-tree (801b) and respective clone line table (802b) resulted from the foreground restoring process 702 of the corrupted master volume C0. As illustrated, destination snapshot C5 has been generated, LUN$_x$ has been re-assigned to the destination snapshot C5, and I/O request (803b) to LUN$_x$ has been directed to C5.

SF relationship data structures resulted from the foreground process 702 comprise excessive elements and relationships therebetween, which may cause degradation of performance and other operational characteristics of the storage system. Thus, there is a need to modify such SF relationship data structure into definitive SF relationship data structure with minimized excessive elements and respective connections. Definitive S-tree (801c) and definitive clone line table (802c) for the exemplary snapshot family is illustrated in FIG. 8c. There is further a need to modify SF mapping data structure in accordance with re-assigned LUNs and with definitive SF relationship data structure.

As will be further detailed with reference to FIG. 9, the background restoring process (703) provides the required modification (707) of SF mapping data structure whilst keeping its consistency in view of incoming read and/or write requests as well as of the snapshot family's evolution (if any) during the background process.

For purpose of illustration only, the corrupted SF member is presented in FIGS. 8a-8e as a master volume. Those skilled in the art will readily appreciate that the teachings of the presently disclosed subject matter are applicable in a similar manner to restoring any writable SF member from any of its read-only copy.

By way of non-limiting example, the control layer can start the background process at a scheduled time and/or responsive to a predefined event (e.g. immediately after foreground process acknowledgement sent, etc.) and/or storage system state (e.g. responsive to reduction of storage system's performance, etc.).

Figure 9:
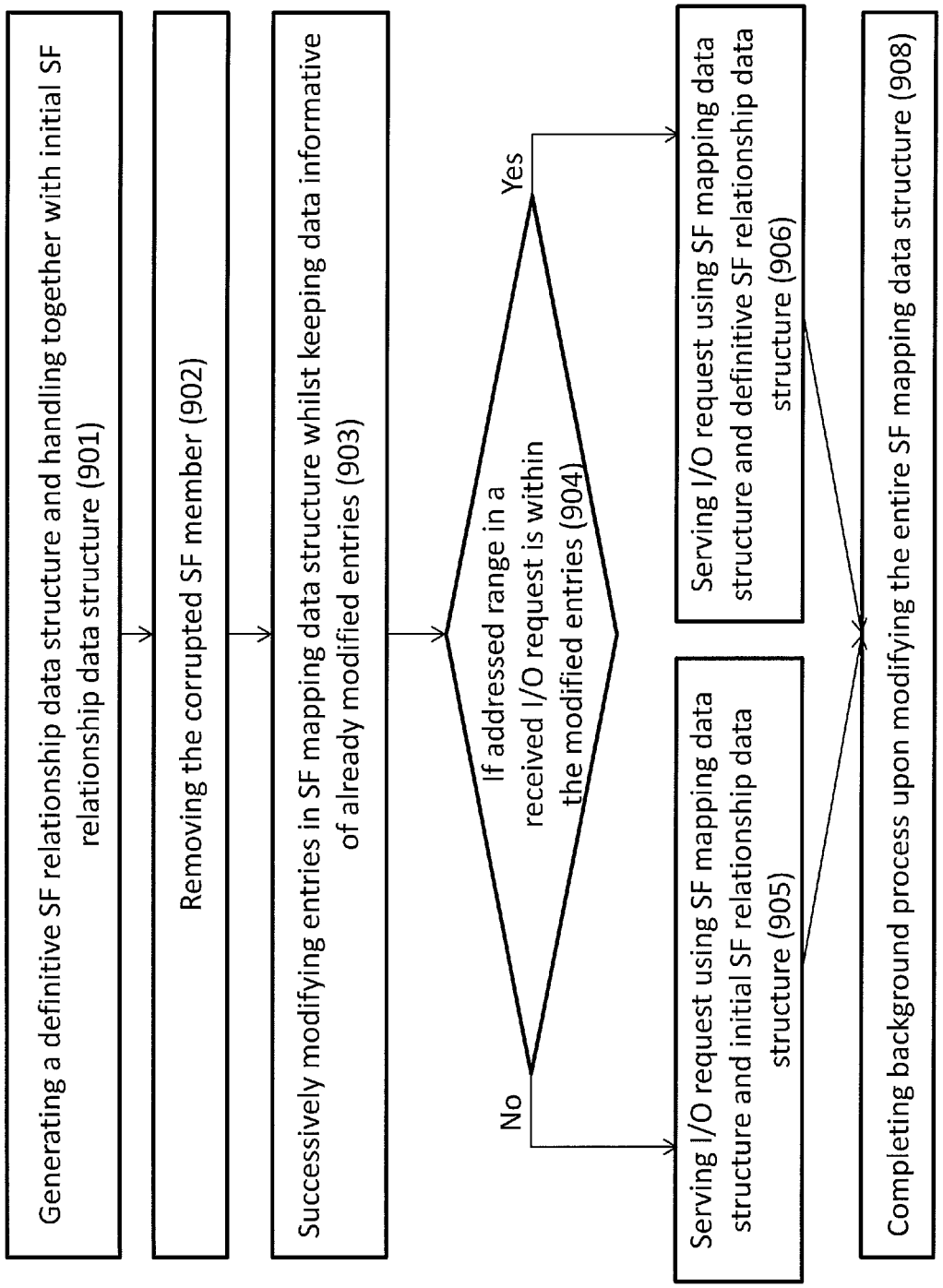
FIG. 9 illustrates a generalized flow chart of operating the storage system during a background restoring process in accordance with certain embodiments of the presently disclosed subject matter.

FIG. 9 illustrates a generalized flow chart of operating the storage system during the background restoring process 703 in accordance with certain embodiments of the presently disclosed subject matter. Upon start of the background process, the control layer generates (901) a definitive SF relationship data structure corresponding to initial SF relationship data structure characterising the snapshot family when the foreground restoring process started. The definitive SF relationship data structure can be derived from the initial SF relationship data structure by replacing a corrupted SF member by the generated destination snapshot. In a case when new snapshots from the destination snapshot are generated before completion of the background process (as illustrated for the exemplary snapshot family by S-tree (801*d*) and clone line table (802*d*) in FIG. 8*d*), the definitive SF relationship data structure further comprises new snapshots directly connected to the destination SF member replacing the corrupted SF member (as illustrated for the exemplary snapshot family by definitive S-tree (801*e*) and definitive clone line table (802*e*) in FIG. 8*e*).

The control layer handles (901) both initial and definitive SF relationship data structures till the end of the background process. The definitive SF relationship data structure can be modified during the background process responsive to snapshot family evolution.

The control layer further removes (902) the corrupted SF member. The process of removing the corrupted SF member can comprise removing the corrupted SF member from the volume tables (unless it was done in the foreground process) followed by destaging all corresponding data blocks and corresponding modification of SF mapping structure. The corresponding data blocks can include data blocks associated with the corrupted SF member and with SF members in inheritance cluster associated, in the definitive relationship data structure, with the destination SF member at the moment of removing. By way of non-limiting example, when providing removing the volume C0 in the exemplary snapshot family characterized by S-tree 801*c*, all dirty data blocks associated with C0, S1, S2, S3, S4 and C5 shall be destaged. By way of another non-limiting example, when providing removing the volume C0 in the exemplary snapshot family characterized by S-tree 801*e*, all dirty data blocks associated with C0, S1, S2, S3, S4, S6, S7 and C5 shall be destaged.

Upon removing the corrupted SF member and corresponding modification of SF mapping structure, the control layer successively further modifies (903) entries (mappings) in the SF mapping data structure whilst keeping data informative of mapping entries which have been already modified.

By way of non-limiting example, the modification (903) can include changes in entries 401-1-401-*k* in accordance with re-assigned LUNs and further changes in respective MVE data structures in accordance with definitive SF relationship data structure. MVE data structures can be modified so as to provide uniqueness of presenting a given shared DBA range by one and only one family member among the family members sharing the DBA range. The uniqueness of presenting the given DBA range is obtained by selecting, in accordance with predefined rules, a representative member and omitting other members sharing the given DBA range. By way of non-limiting example, the oldest SF member among SF members sharing a given DBA range can be kept as the representative member in the MVE data structure, while the other SF members sharing the same given DBA range can be omitted. In such a case, modifying the MVE in accordance with definitive S-tree requires replacement of the corrupted SF member by the destination SF member as a representative member.

When an I/O request is received, the control layer checks (904) whether the addressed LBA range is within the already modified entries of SF mapping data structure or not. If not, the control layer serves (905) the I/O request using SF mapping data structure and the initial SF relationship data structure. If Yes, the control layer serves (906) the I/O request using SF mapping data structure and the definitive SF relationship data structure. If a sub-range of the addressed LBA range corresponds to the already modified entries and another sun-range does not, the control layer splits the received request into two I/O requests, and serves these two I/O requests, each in accordance with the respective sub-range. Using SF mapping data structure together with SF relationship data structure for serving I/O requests is detailed in U.S. application Ser. No. 14/036,557 filed Sep. 25, 2012, assigned to the Assignee of the presently disclosed subject matter and incorporated herewith by reference in its entirety.

In a case of SF mapping data structure configured as a mapping tree, successively modifying the mapping entries can include traversing the mapping tree from LBA=0 to the last LBA in the SF logical address space. A counter indicative of a currently traversed LBA is informative of already modified mapping entries and its current value can be kept as data informative of entries which have been already modified. The control layer can check if the addressed LBA range is within the already modified entries by comparing the addressed LBAs with a current counter's value.

When the entire SF mapping data structure has been modified, the background process is completed (908), and the initial SF relationship data structure can be deleted and the definitive SF relationship data structure can be used for further operation of the storage system.

Responsive to generating a new snapshot from the destination snapshot before completion of the background process, the control layer modifies the definitive SF relationship data structure accordingly, and uses the modified definitive S-tree (or other structure) in the further background process.

If, in accordance with the predefined rules, MVE data structure is configured such that the oldest SF member among SF members sharing a given DBA range is kept as the representative member in the MVE, the above modification of definitive S-tree does not require re-modification of already modified mapping entries. Accordingly, upon such modification, the data informative of already modified mapping entries remains unchanged, and the control layer continues the background process. In a case of SF mapping data structure configured as a mapping tree, the control layer continues traversing the mapping tree without resetting the counter.

Alternatively, MVE data structure can be configured so that modification of definitive S-tree requires re-modification of already modified mapping entries (e.g. if the newest SF member among SF members sharing a given DBA range is selected as the representative member in the MVE data structure). In such a case, the control layer needs to re-modify already modified mapping entries. In a case of SF mapping data structure configured as a mapping tree, the control layer re-starts traversing the mapping tree and resets the counter indicative of a currently traversed LBA.

Thus, upon receiving a command for restoring a writable SF member from a read-only snapshot thereof, the control layer provides an atomic operation comprising generation of a new writable SF member from the read-only snapshot, respective modification of SF relationship data structure and modification of LUNs' assignment of SF members. Upon successful atomic operation, the control layer sends acknowledgement indicative of a completion of the restoration. Modification of SF mapping data structure is provided as a background process during storage system operation. During such operation, the storage system uses the newly generated writable SF member as a restored writable SF member. During the background process the SF mapping data structure is modified in correspondence with the provided atomic operation and further evolution (if any) of the SF relationship data structure.

The above foreground and background processes can be provided by a processor using SF mapping data structure and SF relationship data structures stored in a memory operating in conjunction with the processor. The processor and the memory can be parts of the snapshot management, allocation and/or cache management functional modules involved in the operations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the presented subject matter may be, at least partly, a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating a storage system comprising a control layer operable to manage a snapshot family (SF) constituted by SF members having hierarchical relations represented by an initial SF relationship data structure, the method comprising:
   upon receiving a command for restoring a writable SF member from a read-only snapshot thereof, the control layer providing an atomic operation comprising:
      generating a new writable snapshot of the read-only snapshot to yield a destination SF member;
      generating a definitive SF relationship data structure corresponding to the initial SF relationship data structure, wherein the initial SF relationship data structure characterizes the SF when the atomic operation started and wherein the definitive SF relationship data structure is a modified copy of the initial SF relationship data structure;
      re-assigning all logical unit numbers (LUNs) from the writable SF member to be restored to the destination SF member; and
      upon successful completion of the atomic operation, the control layer sending acknowledgement indicative of successful restoring the writable SF member;
   modifying, during a background process provided by the control layer and in correspondence with the atomic operation, a SF mapping data structure, the SF mapping data structure comprises mappings between logical and physical addresses corresponding to SF members, wherein the modifying includes successively modifying the mappings in the SF mapping data structure whilst keeping data informative of mappings which have been already modified;
   handling the initial and the definitive SF relationship data structures till the end of the background process; and
   serving an I/O request addressed to an LBA range corresponding to already modified mappings of the SF mapping data structure using the SF mapping data structure and the definitive SF relationship data structure, and serving an I/O request addressed to an LBA range corresponding to unmodified mappings of the SF mapping data structure using the SF mapping data structure and the initial SF relationship data structure.

2. The method of claim 1, wherein modifying the SF mapping data structure is provided with further correspondence with one or more write requests received during the background process and addressed to SF members.

3. The method of claim 1, wherein modifying the SF mapping data structure is provided with further correspondence with one or more modifications of the definitive SF relationship data structure during the background process.

4. The method of claim 1 wherein the writable SF member to be restored is a master volume of the snapshot family.

5. The method of claim 1, wherein the control layer starts the background process in accordance with at least one condition selected from a group constituted by a scheduled time, one or more predefined events and one or more predefined storage system states.

6. The method of claim 1, wherein the SF mapping data structure is configured as a mapping tree, wherein successively modifying the mappings comprises traversing the mapping tree; wherein the data informative of mappings which have been already modified is a value of a counter indicative of a currently traversed LBA, the method further comprising comparing, by the control layer, the LBA range addressed in the I/O request with a current counter's value, and serving the I/O request accordingly.

7. The method of claim 1 further comprising modifying the definitive SF relationship data structure responsive to generating a new snapshot from the destination snapshot before completion of the background process, and serving the I/O request using the definitive SF relationship data structure.

8. The method of claim 1 wherein the definitive SF relationship data structure is derived from the initial SF relationship data structure by replacing the writable SF member to be restored by the destination SF member.

9. A storage system comprising a control layer configured to manage a plurality of snapshot families, each family constituted by snapshot family (SF) members having hierarchical relations represented by an initial SF relationship data structure, wherein the control layer comprises hardware and is further configured:
   upon receiving a command for restoring a writable SF member from a read-only snapshot thereof, to provide an atomic operation comprising:
      generating a new writable snapshot of the read-only snapshot to yield a destination SF member;
      generating a definitive SF relationship data structure corresponding to the initial SF relationship data structure, wherein the initial SF relationship data structure characterizes the SF when the atomic operation started and wherein the definitive SF relationship data structure is a modified copy of the initial SF relationship data structure;
      re-assigning all logical unit numbers (LUNs) from the writable SF member to be restored to the destination SF member; and
      upon successful completion of the atomic operation, to send acknowledgement indicative of successful restoring the writable SF member;

wherein the control layer is further configured to:
provide a background process comprising modifying, in correspondence with the atomic operation, a SF mapping data structure, the SF mapping data structure comprises mappings between logical and physical addresses corresponding to SF members, wherein the modifying includes successively modifying the mappings in the SF mapping data structure whilst keeping data informative of mappings which have been already modified;
handle the initial and the definitive SF relationship data structures till the end of the background process; and
serve, during the background process, an I/O request addressed to an LBA range corresponding to already modified mappings of SF mapping data structure using the SF mapping data structure and the definitive SF relationship data structure, and serve, during the background process, an I/O request addressed to an LBA range corresponding to unmodified mappings of SF mapping data structure using the SF mapping data structure and the initial SF relationship data structure.

10. The storage system of claim 9, wherein the control layer is configured to modify the SF mapping data structure with further correspondence with one or more write requests received during the background process and addressed to SF members.

11. The storage system of claim 9, wherein the control layer is configured to modify the SF mapping data structure with further correspondence with one or more modifications of the definitive SF relationship data structure during the background process.

12. The storage system of claim 9, wherein the control layer is configured to start the background process in accordance with at least one condition selected from a group constituted by a scheduled time, one or more predefined events and one or more predefined storage system states.

13. The storage system of claim 9, wherein the SF mapping data structure is configured as a mapping tree, wherein successively modifying the mappings comprises traversing the mapping tree; wherein the data informative of mappings which have been already modified is a value of a counter indicative of a currently traversed LBA, the control layer is further configured to compare the LBA range addressed in the I/O request with a current counter's value, and to serve the I/O request accordingly.

14. The storage system of claim 9, wherein the control layer is further configured to modify the definitive SF relationship data structure responsive to generating a new snapshot from the destination snapshot before completion of the background process, and to serve the I/O request using the modified definitive SF relationship data structure.

15. The storage system of claim 9, wherein the control layer is further configured to derive the definitive SF relationship data structure from the initial SF relationship data structure by replacing the writable SF member to be restored by the destination SF member.

16. A non-transitory computer readable storage medium comprising computer readable program code embodied therein for operating a storage system comprising a control layer with a cache memory, the control layer operable to manage a plurality of snapshot families, each family constituted by snapshot family (SF) members having hierarchical relations represented by an initial SF relationship data structure, the computer readable program code causing the control layer:
upon receiving a command for restoring a writable SF member from a read-only snapshot thereof, to provide an atomic operation comprising:
generating a new writable snapshot of the read-only snapshot thereby giving rise to a destination SF member;
generating a definitive SF relationship data structure corresponding to the initial SF relationship data structure, wherein the initial SF relationship data structure characterizes the SF when the atomic operation started and wherein the definitive SF relationship data structure is a modified copy of the initial SF relationship data structure;
re-assigning all logical unit numbers (LUNs) from the writable SF member to be restored to the destination SF member; and
upon successful completion of the atomic operation, to send acknowledgement indicative of successful restoring the writable SF member;
modifying, during a background process provided by the control layer and in correspondence with the atomic operation, a SF mapping data structure, the SF mapping data structure comprises mappings between logical and physical addresses corresponding to SF members, wherein the modifying includes successively modifying the mappings in the SF mapping data structure whilst keeping data informative of mappings which have been already modified;
handling the initial and the definitive SF relationship data structures till the end of the background process; and
serving an I/O request addressed to an LBA range corresponding to already modified mappings of the SF mapping data structure using the SF mapping data structure and the definitive SF relationship data structure, and serving an I/O request addressed to an LBA range corresponding to unmodified mappings of the SF mapping data structure using the SF mapping data structure and the initial SF relationship data structure.

* * * * *